(12) United States Patent
Doshi et al.

(10) Patent No.: US 8,296,407 B2
(45) Date of Patent: Oct. 23, 2012

(54) CALCULATION, REPRESENTATION, AND MAINTENANCE OF SHARING INFORMATION IN MESH NETWORKS

(75) Inventors: Bharat T. Doshi, Holmdel, NJ (US); Zbigniew M. Dziong, Montreal (CA); Ramesh Nagarajan, Somerset, NJ (US); Muhammad A. Qureshi, Green Brook, NJ (US); Yung-Terng Wang, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 2065 days.

(21) Appl. No.: 10/673,381

(22) Filed: Sep. 26, 2003

(65) Prior Publication Data

US 2004/0193728 A1 Sep. 30, 2004

Related U.S. Application Data

(60) Provisional application No. 60/459,163, filed on Mar. 31, 2003.

(51) Int. Cl.
*G06F 15/177* (2006.01)
*G06F 15/173* (2006.01)
*H04J 3/22* (2006.01)

(52) U.S. Cl. ............... 709/223; 709/238; 370/468

(58) Field of Classification Search .............. 709/238
See application file for complete search history.

(56) References Cited

U.S. PATENT DOCUMENTS

| | | | |
|---|---|---|---|
| 4,190,821 A | 2/1980 | Woodward | 714/4 |
| 4,594,709 A | 6/1986 | Yasue | 714/4 |
| 4,797,882 A | 1/1989 | Maxemchuk | 370/94 |
| 5,365,518 A | 11/1994 | Noser | 370/535 |
| 5,452,286 A | 9/1995 | Kitayama | 370/228 |
| 5,506,956 A | 4/1996 | Cohen | 395/182.04 |
| 5,706,276 A | 1/1998 | Arslan et al. | 370/216 |
| 5,754,543 A | 5/1998 | Seid | 370/351 |
| 5,854,903 A | 12/1998 | Morrison et al. | 395/200.79 |
| 5,856,981 A * | 1/1999 | Voelker | 714/712 |
| 5,881,048 A | 3/1999 | Croslin | 370/228 |
| 5,933,422 A | 8/1999 | Kusano et al. | 370/331 |
| 5,933,425 A | 8/1999 | Iwata | 370/351 |
| 5,956,339 A | 9/1999 | Harada et al. | 370/400 |
| 5,995,485 A | 11/1999 | Croslin | 370/216 |

(Continued)

OTHER PUBLICATIONS

"Cisco's Packet over SONET/SDH (POS) Technology Support; Mission Accomplished" Copyright 1997. Cisco Systems, Inc. pp. 1-8.

(Continued)

*Primary Examiner* — Djenane Bayard
*Assistant Examiner* — Joiya M Cloud
(74) *Attorney, Agent, or Firm* — Mendelsohn, Drucker & Associates, P.C.

(57) ABSTRACT

A method for representing, in a network data structure, a minimum amount of protection bandwidth required to be reserved on each link in a mesh network, to restore service upon failure of another node or link in the network. The method includes (1) receiving a request for a new service in the network, wherein the new service is represented by a service data structure having an identification of each link and transit node in a primary path for the new service, (2) determining, using the network and service data structures, whether the new service requires additional protection bandwidth to be reserved on any link in the network, and (3) updating the network data structure if any additional protection bandwidth is determined to be needed. In one implementation the network and service data structures are vectors and the steps of determining and updating involve vector operations between these structures.

24 Claims, 20 Drawing Sheets

U.S. PATENT DOCUMENTS

| | | | |
|---|---|---|---|
| 6,023,452 A | 2/2000 | Shiragaki | |
| 6,075,766 A | 6/2000 | Croslin | 370/225 |
| 6,097,696 A | 8/2000 | Doverspike | 370/216 |
| 6,104,701 A | 8/2000 | Avargues et al. | 370/238 |
| 6,130,875 A | 10/2000 | Doshi et al. | 370/225 |
| 6,141,319 A | 10/2000 | Dighe et al. | 370/218 |
| 6,205,117 B1 | 3/2001 | Doshi et al. | 370/228 |
| 6,282,170 B1 | 8/2001 | Bentall et al. | 370/225 |
| 6,477,582 B1 | 11/2002 | Luo et al. | 709/241 |
| 6,512,740 B1 | 1/2003 | Baniewicz et al. | 370/216 |
| 6,606,297 B1* | 8/2003 | Magill et al. | 370/216 |
| 6,606,303 B1 | 8/2003 | Hassel et al. | 370/238 |
| 6,643,464 B1* | 11/2003 | Roorda et al. | 398/59 |
| 6,697,334 B1* | 2/2004 | Klincewicz et al. | 370/238 |
| 6,711,125 B1 | 3/2004 | Walrand et al. | 370/223 |
| 6,744,727 B2 | 6/2004 | Liu et al. | 370/228 |
| 6,760,302 B1 | 7/2004 | Ellinas et al. | 370/228 |
| 6,778,492 B2* | 8/2004 | Charny et al. | 370/228 |
| 6,807,653 B2 | 10/2004 | Saito | 716/2 |
| 6,842,723 B2 | 1/2005 | Alicherry et al. | 703/2 |
| 6,850,487 B2 | 2/2005 | Mukherjee et al. | 370/225 |
| 6,856,592 B2 | 2/2005 | Grover et al. | 370/216 |
| 6,863,363 B2 | 3/2005 | Yabuta | 347/19 |
| 6,882,627 B2 | 4/2005 | Pieda et al. | 370/248 |
| 6,895,441 B1* | 5/2005 | Shabtay et al. | 709/238 |
| 6,904,462 B1* | 6/2005 | Sinha | 709/226 |
| 6,977,889 B1 | 12/2005 | Kawaguchi et al. | 370/228 |
| 6,982,951 B2* | 1/2006 | Doverspike et al. | 370/217 |
| 6,990,068 B1 | 1/2006 | Saleh et al. | 370/225 |
| 6,996,065 B2* | 2/2006 | Kodialam et al. | 370/238 |
| 7,002,917 B1* | 2/2006 | Saleh | 370/238 |
| 7,009,991 B2* | 3/2006 | Shachar et al. | 370/436 |
| 7,039,009 B2 | 5/2006 | Chaudhuri et al. | 370/225 |
| 7,042,836 B2 | 5/2006 | Isonuma et al. | 370/224 |
| 7,046,665 B1* | 5/2006 | Walrand et al. | 370/392 |
| 7,099,286 B1* | 8/2006 | Swallow | 370/255 |
| 7,133,358 B2 | 11/2006 | Kano | 370/221 |
| 7,180,852 B1 | 2/2007 | Doverspike et al. | 370/217 |
| 7,188,280 B2 | 3/2007 | Shinomiya et al. | 714/43 |
| 7,197,008 B1 | 3/2007 | Shabtay et al. | 370/218 |
| 7,209,975 B1* | 4/2007 | Zang et al. | 709/238 |
| 7,218,851 B1* | 5/2007 | Zang | 398/33 |
| 7,248,561 B2* | 7/2007 | Ishibashi et al. | 370/228 |
| 7,272,116 B1* | 9/2007 | Houchen | 370/258 |
| 7,274,869 B1 | 9/2007 | Pan | 398/5 |
| 7,286,489 B2 | 10/2007 | Ades | 370/254 |
| 7,301,895 B2 | 11/2007 | Saleh et al. | 370/218 |
| 7,308,198 B1* | 12/2007 | Chudak et al. | 398/58 |
| 7,324,552 B1* | 1/2008 | Galand et al. | 370/468 |
| 7,342,873 B1 | 3/2008 | Nagarajan | 370/217 |
| 7,352,692 B1 | 4/2008 | Saleh et al. | 370/216 |
| 7,362,709 B1 | 4/2008 | Hui et al. | 370/237 |
| 7,398,321 B2 | 7/2008 | Qiao et al. | 709/239 |
| 7,430,164 B2 | 9/2008 | Bare | 370/217 |
| 7,477,657 B1* | 1/2009 | Murphy et al. | 370/468 |
| 7,502,313 B2* | 3/2009 | Saleh et al. | 370/216 |
| 7,652,983 B1* | 1/2010 | Li et al. | 370/217 |
| 7,774,448 B2* | 8/2010 | Shah-Heydari | 709/223 |
| 2001/0038471 A1 | 11/2001 | Agrawal et al. | 359/110 |
| 2001/0048660 A1 | 12/2001 | Saleh et al. | 370/216 |
| 2002/0004843 A1 | 1/2002 | Andersson et al. | 709/238 |
| 2002/0009092 A1 | 1/2002 | Seaman et al. | 370/406 |
| 2002/0059432 A1* | 5/2002 | Masuda et al. | 709/227 |
| 2002/0067693 A1* | 6/2002 | Kodialam et al. | 370/216 |
| 2002/0071392 A1 | 6/2002 | Grover et al. | 370/241 |
| 2002/0097671 A1 | 7/2002 | Doverspike et al. | 370/216 |
| 2002/0141334 A1 | 10/2002 | Deboer et al. | 370/227 |
| 2002/0174207 A1 | 11/2002 | Battou | 709/223 |
| 2002/0181444 A1 | 12/2002 | Acampora | 370/352 |
| 2002/0191247 A1* | 12/2002 | Lu et al. | 359/124 |
| 2002/0194339 A1 | 12/2002 | Lin et al. | 709/226 |
| 2003/0005165 A1 | 1/2003 | Langridge et al. | 709/251 |
| 2003/0009582 A1 | 1/2003 | Qiao et al. | 709/233 |
| 2003/0016624 A1 | 1/2003 | Bare | 370/217 |
| 2003/0018812 A1 | 1/2003 | Lakshminarayana et al. | 709/241 |
| 2003/0021222 A1 | 1/2003 | Boer et al. | 370/216 |
| 2003/0037276 A1 | 2/2003 | Mo et al. | 714/4 |
| 2003/0058798 A1 | 3/2003 | Fleischer et al. | |
| 2003/0065811 A1* | 4/2003 | Lin et al. | 709/232 |
| 2003/0095500 A1 | 5/2003 | Cao | 370/216 |
| 2003/0112760 A1 | 6/2003 | Puppa et al. | 370/241.1 |
| 2003/0117950 A1* | 6/2003 | Huang | 370/220 |
| 2003/0147352 A1 | 8/2003 | Ishibashi et al. | 370/248 |
| 2003/0169692 A1 | 9/2003 | Stern et al. | 370/242 |
| 2003/0179700 A1 | 9/2003 | Saleh et al. | 370/216 |
| 2003/0179701 A1 | 9/2003 | Saleh et al. | 370/216 |
| 2003/0193944 A1 | 10/2003 | Sasagawa | 370/389 |
| 2003/0223357 A1 | 12/2003 | Lee | 370/218 |
| 2004/0004938 A1 | 1/2004 | Buddhikot et al. | 370/238 |
| 2004/0008619 A1 | 1/2004 | Doshi et al. | 370/217 |
| 2004/0032831 A1 | 2/2004 | Matthews | 370/238 |
| 2004/0042402 A1 | 3/2004 | Galand et al. | 370/237 |
| 2004/0052207 A1 | 3/2004 | Charny et al. | 370/216 |
| 2004/0057375 A1 | 3/2004 | Shiragaki et al. | 370/216 |
| 2004/0114512 A1 | 6/2004 | Johri | 370/225 |
| 2004/0165526 A1 | 8/2004 | Yada et al. | 370/216 |
| 2004/0184402 A1 | 9/2004 | Alicherry et al. | 370/216 |
| 2004/0186696 A1 | 9/2004 | Alicherry et al. | 703/1 |
| 2004/0190441 A1 | 9/2004 | Alfakih et al. | 370/216 |
| 2004/0190445 A1 | 9/2004 | Dziong et al. | 370/225 |
| 2004/0190461 A1 | 9/2004 | Gullicksen et al. | 370/216 |
| 2004/0205237 A1 | 10/2004 | Doshi et al. | |
| 2004/0205239 A1 | 10/2004 | Doshi et al. | 709/241 |
| 2004/0208547 A1 | 10/2004 | Sabat et al. | 398/50 |
| 2004/0221058 A1 | 11/2004 | de Boer et al. | |
| 2004/0233843 A1* | 11/2004 | Barker | 370/225 |
| 2005/0036442 A1 | 2/2005 | Saleh et al. | 370/216 |
| 2005/0063299 A1 | 3/2005 | Atkinson et al. | |
| 2005/0185652 A1 | 8/2005 | Iwamoto | 370/395.1 |
| 2005/0201276 A1 | 9/2005 | Sinha | 370/225 |
| 2005/0232144 A1 | 10/2005 | Doverspike et al. | 370/216 |
| 2006/0004916 A1 | 1/2006 | Caviglia et al. | |
| 2006/0013149 A1 | 1/2006 | Jahn et al. | 370/254 |
| 2006/0051090 A1 | 3/2006 | Saniee et al. | 398/59 |
| 2006/0153066 A1 | 7/2006 | Saleh et al. | 370/216 |
| 2006/0178918 A1 | 8/2006 | Mikurak | 705/7 |
| 2007/0011284 A1 | 1/2007 | Le Roux et al. | 709/223 |
| 2007/0104120 A1 | 5/2007 | Shah-Heydari | 370/256 |
| 2007/0189191 A1 | 8/2007 | Ades | 370/254 |
| 2008/0095045 A1 | 4/2008 | Owens et al. | 370/220 |
| 2008/0225696 A1 | 9/2008 | Saleh et al. | 370/216 |
| 2008/0310299 A1 | 12/2008 | Saleh et al. | 370/221 |
| 2009/0040989 A1 | 2/2009 | da Costa et al. | 370/338 |

OTHER PUBLICATIONS

"Optical Network Design and Restoration" by B. T. Doshi, et al., BLTJ, Jan.-Mar. 1999.

"Design of a Meta-mesh of Chain Subnetworks: Enhancing the Attractiveness of Mesh-Restorable WDM networldng on Low Connectivity Graphs" by W. D. Grover and J. Doucette, IEEE JSAC, vol. 20, No. 1, Jan. 2002.

"SONET Bidirectional Line-Switched Ring Equipment Generic Criteria," Generic Requirements, GR-1230-CORE, Issue 4, Dec. 1998, pp. 3-48 through 3-61.

"RSVP-TE: Extension to RSVP for LSP Tunnels" by D. Awduche, L. Berger, D. Gan, T. Li, V. Srinivasan, and G. Swallow; Cisco Systems, Inc. Dec. 2001, pp. 1-55.

"Operation & Maintenance mechanism for MPLS networks"; ITU-T Recommnendation Y.1711; Telecommunication Standardization Sector of ITU; Series Y: Global Information Infrastructure and Internet Protocol Aspects; Nov. 2002.

"Availability Analysis of Span-Restorable Mesh Networks," M. Clouqueur, WD Grover—IEEE Journal on Selected Areas in Communications, 2002, pp. 1-30.

"Quantifying and Managing the Influence of Maintenance Actions on the Survivability of Mesh-Restorable Networks" WD Grover, M. Clouqueur, T. Bach—Proceedings of National Fiber Optic Engineers, 2001, pp. 1-12.

"Design of a Meta-Mesh of Chain Subnetworks: Enhancing the Attractiveness of Mesh-Restorable WDM Networking on Low Connectivity Graphs," Grover, W.D. Doucette, J. TRLabs, Edmonton, Alta.; This paper appears in: Selected Areas in Communications, IEEE Journal on Publication Date: Jan. 2002, vol. 20, Issue: 1, pp. 47-61.

"Availability Analysis of Span-Restorable Mesh Networks," Clouqueur, M., Grover, W.D.; Selected Areas in Communications, IEEE Journal on vol. 20, Issue 4, May 2002, pp. 810-821.

"Fast, Scalable, and Distributed Restoration in General Mesh Optical Networks" by Gary P. Austin et al.; Bell Labs Technical Journal; Jan.-Jun. 2001; pp. 67-81.

"Optimal Design and Evaluation of Survivable WDM Transport Networks" by Yasuhiro Miyao et al.; IEEE Journal on Selected Areas in Communications, vol. 16, No. 7, Sep. 1998, pp. 1190-1198.

"Using Local Information for WDM Network Protection", by Hungjen Wang et al., http://www.mit.edu/~modiano/papers/C46.pdf, 2002, pp. 1-4.

* cited by examiner

TABLE 1

| Link | L1 | L2 | L3 | L4 | L5 | L6 | L7 | N1 | N2 | N3 | N4 | N5 | N6 | Max |
|------|----|----|----|----|----|----|----|----|----|----|----|----|----|----|
| L1 |  |  | 1 | 1 |  | 1 |  |  |  |  |  | 1 |  | 1 |
| L2 |  |  | 1 | 1 |  | 1 |  |  |  |  |  | 1 |  | 1 |
| L3 | 1 | 1 |  | 1 |  |  |  |  |  |  |  |  |  | 1 |
| L4 | 1 | 1 |  |  | 1 |  | 1 | 1 |  | 1 |  |  |  | 1 |
| L5 |  |  | 1 | 1 |  | 1 |  | 1 |  |  |  | 1 |  | 1 |
| L6 |  |  |  | 1 | 2 |  | 1 |  | 1 | 1 |  |  |  | 2 |
| L7 |  |  | 1 | 1 | 1 | 1 |  |  | 1 |  |  | 1 |  | 1 |

FIG. 2

TABLE 2

| Link | L1 | L2 | L3 | L4 | L5 | L6 | L7 | N1 | N2 | N3 | N4 | N5 | N6 | Max |
|------|----|----|----|----|----|----|----|----|----|----|----|----|----|-----|
| L1   | 1  |    | 2  | 2  |    | 1  |    |    |    |    |    | 2  |    | 2   |
| L2   | 1  | 1  | 2  | 2  |    | 1  |    |    |    |    |    | 2  |    | 2   |
| L3   |    |    |    | 1  |    |    |    | 1  |    |    |    |    |    | 1   |
| L4   |    |    |    |    | 1  |    | 1  | 1  |    |    |    |    |    | 1   |
| L5   |    |    | 1  |    | 2  |    | 1  |    |    | 1  |    | 1  |    | 1   |
| L6   |    |    |    | 1  | 1  | 1  |    |    | 1  | 1  |    |    |    | 2   |
| L7   |    |    | 1  | 1  | 1  | 1  |    |    | 1  |    |    | 1  |    | 1   |

FIG. 3

| NA | NB | L1 | L2 | L3 | L4 |
|---|---|---|---|---|---|
| 0 | 1 | 0 | 1 | 0 | 1 |

$V_{pnl}$

| NA | NB |
|---|---|
| 1 | 1 |

CALCULATION, REPRESENTATION, AND MAINTENANCE OF SHARING INFORMATION IN MESH NETWORKS

CROSS-REFERENCE TO RELATED APPLICATIONS

This application claims the benefit of the filing date of U.S. provisional application No. 60/459,163, filed on Mar. 31, 2003. The subject matter of this application is related to U.S. patent application Ser. No. 10/639,728, filed on Aug. 12, 2003, the teachings of which are incorporated herein by reference.

This application is one of a set of U.S. patent applications consisting of Ser. No. 10/673,381 filed on Sep. 26, 2003, Ser. No. 10/673,383 filed on Sep. 26, 2003, Ser. No. 10/673,382 filed on Sep. 26, 2003, Ser. No. 10/673,057 filed on Sep. 26, 2003, and Ser. No. 10/673,055 filed on Sep. 26, 2003, all of which were filed on the same date and the teachings of all of which are incorporated herein by reference.

BACKGROUND OF THE INVENTION

1. Field of the Invention

The present invention relates to network communications and, more specifically, to restoration path sharing.

2. Description of the Related Art

Advances in wavelength-division multiplexing (WDM) related technologies have started to allow for routing and networking at the optical layer (e.g., optical switch layer) of communications networks, providing a migration toward true optical-layer networking. Optical-layer networking associated with mesh-connected optical networks creates the need for routing wavelength demands over the mesh optical networks and an equivalent need for service recovery in the optical domain in the event of failures.

Traditionally, the optical-layer network provided for fast recovery services, while data networks (e.g., Internet Protocol (IP) networks) were primarily targeted to achieve "best-effort" services. However, with the increasing use of data networks to carry time-critical data (e.g., voice-over-IP (VoIP) data), resiliency and fast recovery of service are becoming important features of data networks as well. Advances in traffic engineering of data networks, such as those covered under the umbrella of multiprotocol label switching (MPLS), have provided a framework for directing the flow of specific services within IP networks.

For both optical-layer networking applications and data networking applications, distribution of topology information, and, in particular, restoration, recovery, and sharing information, is important to the efficient and timely recovery of services. However, many of the restoration and recovery schemes in the prior art fail to provide a compact representation of the relevant information, methods to utilize the data in path calculations in consideration of multiple cost criteria in a way that benefit from sharing of protection link resources, and efficient, distributed mechanisms for making that data available where and when it is needed.

SUMMARY OF THE INVENTION

Problems in the prior art are addressed in accordance with principles of the present invention by a shared mesh network (SMN) that includes components for compact representation and maintenance of network sharing information, dissemination of the sharing information within the network, and improved service primary and restoration path calculation as a function of the sharing information.

In one embodiment, the SMN is an IP network, and sharing components include extensions to the multiprotocol label switching (MPLS) traffic engineering specifications, specifically, open shortest path first with traffic engineering extensions (OSPF-TE) and OSPF opaque link-state advertisement option.

The SMN includes components that determine primary/restoration path pairs in consideration of the grouping of certain links within the network into shared-risk link groups (SRLGs). Links that belong to SRLGs having a primary path link, are set to a link cost of infinity, while the remaining links that do not belong to such SRLGs are evaluated as to their ability to support sharing of restoration bandwidth. If a link supports sharing, its link cost is reduced by a factor R. This factor R can be a function of the sharing degree for the link as discussed previously. Ultimately, the adjusted link costs are used in a minimum-cost primary/restoration path calculation.

Components of the SMN distribute an accurate but optimized link state description in the form of an integer node-link or node vectors. The SMN features path-based recovery providing efficient sharing of protection capacity, while putting few requirements on intermediate network elements. The SMN includes mechanisms for fast detection, fast failure notification, signaling to enable protection and bandwidth sharing, and identification of locally cached vs. transmitted sharing information. Although not limited to optical applications, the present invention can be implemented in communication networks that transmit signals between nodes using optical transmission technology.

In one possible implementation, the shared mesh network includes (a) two or more nodes, (b) two or more optical links interconnecting the nodes, (c) a network manager (either centralized or distributed) adapted to control reservation of protection bandwidth for the links, and (d) components for calculating and updating sharing information. In this implementation, a first link in the network is part of two or more different protection paths, where each protection path corresponds to a different primary path. The network manager makes use of the sharing information to determine how much protection bandwidth to reserve on the first link for the two or more protection paths in such a way that the protection bandwidth reserved on the first link is shared between the protection paths of the two or more primary paths. As such, the amount of protection bandwidth reserved on the first link can be less than the sum of the bandwidths of the two or more primary paths.

In one embodiment, the present invention is a method that may be implemented by a network manager for a mesh network a plurality of nodes interconnected by a plurality of links. According to the method, information associated with the mesh network is represented in a network data structure, wherein the network data structure comprises, for each link in the network and each node or other link in the network, a representation of a minimum amount of protection bandwidth required to be reserved on said each link to restore service upon failure of said node or other link. A request is received for a new service in the network, wherein the new service is represented by a service data structure comprising an identification of each link and transit node in a primary path for the new service. Using the network and service data structures, it is determined whether the new service requires additional protection bandwidth to be reserved on any link in the network, and the network data structure is updated if any additional protection bandwidth is determined to be required for the new service.

BRIEF DESCRIPTION OF THE DRAWINGS

Other aspects, features, and advantages of the present invention will become more fully apparent from the following detailed description, the appended claims, and the accompanying drawings in which:

FIG. 2 illustrates TABLE 1, which captures an example of the amount of restoration capacity required on each link for recovering from every possible single link or node failure in the SMDN of FIG. 1.

FIG. 3 illustrates TABLE 2, which captures an example of the amount of restoration capacity required on each link for every possible single link or node failure in the SMDN of FIG. 1 after the restoration capacity required to protect an additional primary path has been added to already allocated restoration capacity of TABLE 1.

FIG. 9 depicts the primary path node-link vector representation and the primary path node-vector representation of the new primary path in the network of FIG. 8.

DETAILED DESCRIPTION

Figure 1:
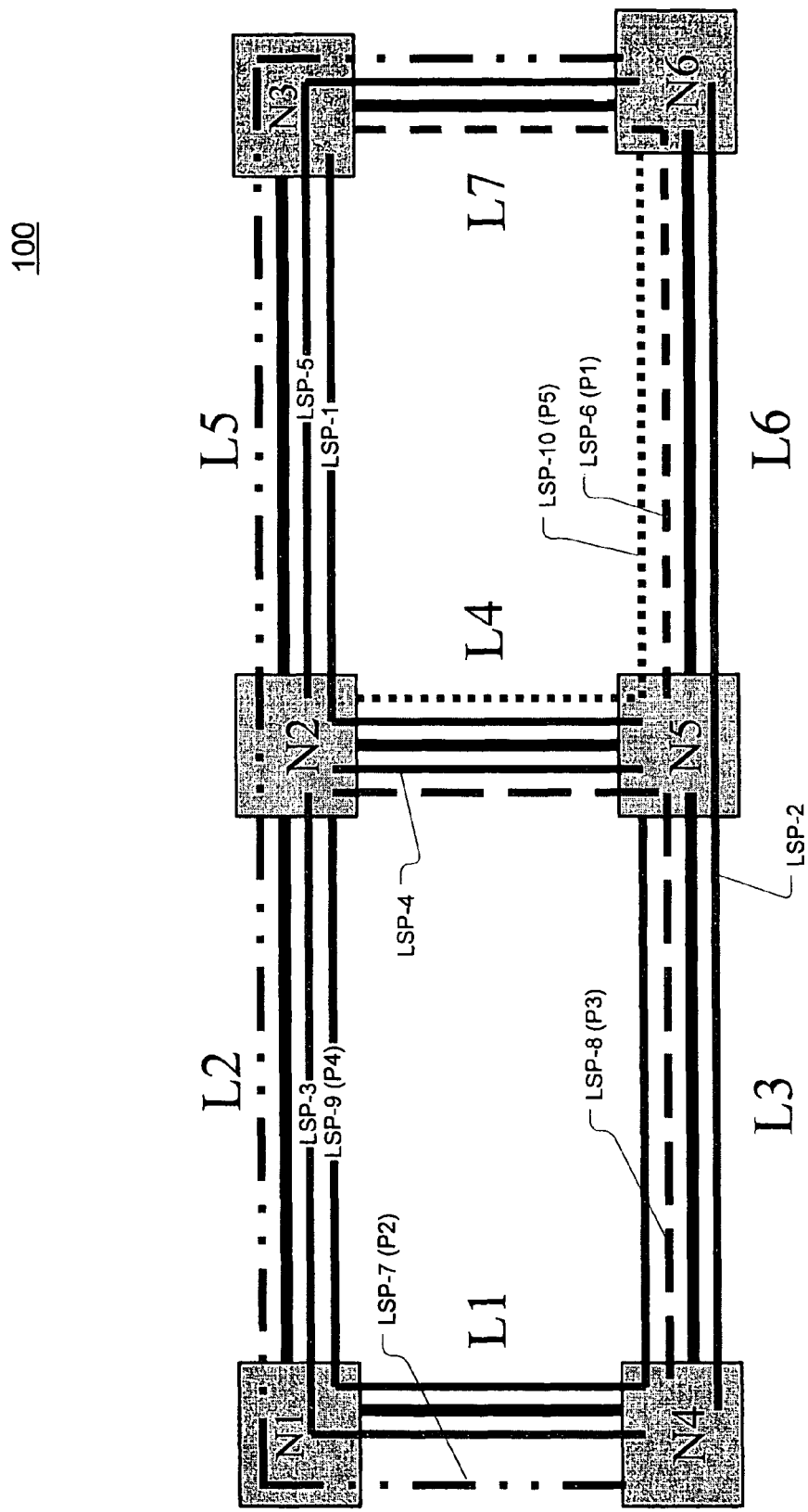
FIG. 1 illustrates an exemplary shared mesh data network (SMDN) according to one embodiment of this invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Introduction

Significant research has been done into various restoration and protection strategies for mesh networks at both the packet and optical layers. Proposed architectures include centralized vs. distributed, pre-computed vs. computed on demand in real-time, and link-based vs. path-based. Characteristics that distinguish between these various restoration and protection strategies include recovery time, failure coverage, and required recovery capacity. A survey of relevant research as well as a specific distributed recovery strategy that provides sub-second recovery times for carrier-scale mesh-based optical networks is addressed in Doshi, B. T., Dravida, S., Harshavardhana, P., Hauser, O., and Wang, Y., "Optical Network Design and Restoration," Bell Labs Technical Journal, January-March 1999 (herein "Doshi '99"), incorporated herein by reference in its entirety.

So-called "shared mesh recovery" is a known concept in optical transport networks (e.g., SONET/SDH). In this scheme, when a failure occurs, the network recovers service carried by the affected paths by using recovery capacity that has been set aside on alternative routes for this purpose. The recovery capacity can be shared over multiple failure scenarios. This involves commensurate switching capability from the transport network elements (e.g., digital cross connects).

For both optical-layer networking applications and data networking applications, resiliency requires extra capacity in the network sufficient to recover from any network failures such as fiber cable cuts or network element failures. This extra capacity is commonly known as the restoration capacity. Normally the extra capacity is sized for recovering from only a single failure at a given time in the network. This is due to the fact that the probability of occurrence of more than one failure during the time interval required to repair a failure is very insignificant, and therefore most of the time it is sufficient to cover just a single network failure. This also provides opportunity to share restoration capacity between disjoint network failures. To understand sharing, realize that if two primary paths carrying traffic are routed disjointly, then a failure affecting one of them will not affect the other. Now, if the corresponding protection paths are routed such that they share common links then the restoration capacity on those links can be shared for restoring traffic between any failures along their primary routes. In general, sharing can be achieved by:

1) realizing primary paths which do not share one or more links along their routes,
2) realizing the links that are common along their restoration paths, and
3) sharing the restoration capacity on these common links across the failure of any disjoint links along their primary routes.

Fast and guaranteed recovery requires that restoration paths need to be computed in advance of any failure and accordingly, restoration capacity needs to be set aside. Efficient use of restoration capacity can be achieved using sharing. Sharing can be achieved by realizing at each link along the restoration path the amount of restoration capacity required to recover from each failure (link or node) in the network and then comparing it with the primary path information for estimating any possible sharing (i.e., the amount of already allocated restoration capacity that can be used for protecting the primary path from a failure along its route). In the case of a centralized implementation, all this information is available at the server. Whereas, in case of a distributed implementation, each node keeps track of the sharing details for each connected link in the downstream direction. This information can be built by passing the primary path information to each node along the protection path.

Sharing information enables computation of more efficient primary and secondary paths. This suggests that when a node that is responsible for computing primary and secondary paths is aware of the sharing information (for a distributed implementation the information is distributed across the nodes in the network), it will be able to compute more efficient paths. Thus, for a distributed implementation, it is desirable to distribute the sharing information at each node across the network. Usually the distribution of sharing information across the network is a costly operation. Therefore, it is highly useful to abstract the most useful information and represent it in a compact form for distribution. A link-state routing protocol (such as OSPF), which already disseminates topology information, can be used to distribute the sharing information.

Unless otherwise clear from the context, the process of "restoration" is synonymous in this specification with the process of "protection." In general, such process involves various associated recovery actions following the detection of a failure, including switching to an alternative (i.e., restoration) path. Depending on the implementation, such process may involve either pre-computation or real-time computation of alternative paths. Pre-computation generally exhibits shorter recovery times but may be less optimal than real-time computation, which benefits from the ability to take into account the most current state of the network demands and resources. Also depending on the implementation, such process may involve either pre-allocation or real-time allocation of bandwidth on alternative paths. Pre-allocation generally exhibits shorter recovery times but may be less desirable than real-time allocation as the former requires the use of the bandwidth even in the absence of a fault for which it is reserved, while the latter leaves the bandwidth available for opportunistic services that do not have a guaranteed quality of service. Also, depending on the implementation, such process may involve either pre-establishment or real-time establishment of alternative paths. Pre-establishment generally exhibits shorter recovery times than real-time establishment and is preferred if it is supported by the network elements.

The Shared Mesh Data Network

FIG. 1 illustrates an exemplary shared mesh data network (SMDN) 100 according to one embodiment of this invention. A mesh network is a network topology (or a subset thereof) in which there are at least two nodes having two or more paths between them. A path is a set of one or more links and zero, one, or more corresponding intermediate nodes that interconnect links. As shown, SMDN 100 includes six ingress/egress nodes N1 to N6 interconnected by seven bidirectional links L1 to L7. These nodes and links provide different paths between different pairs of nodes. For example, links L2, L5, and L7 and nodes N2 and N3 provide a path between nodes N1 and N6. Similarly, links L2, L4, and L6 and nodes N2 and N5 provide another path between nodes N1 and N6.

The concepts of the present invention are discussed in the context of exemplary shared mesh data networks. However, without loss of generality, they may be applied generally to any mesh network (e.g., Sonet, ATM, frame relay, MPLS) that provides traffic-switching control at the nodes incident to the links in the network. A mesh data network is a network in which data is communicated asynchronously between nodes in packetized form and it is a specific case of the more general mesh network. In the present example, SMDN 100 supports the multiprotocol label switching (MPLS) architecture standard per Rosen, E., et al., "RFC3031—Multiprotocol Label Switching Architecture," Network Working Group, The Internet Society, January 2001, incorporated herein by reference in its entirety; however, as would be understood by one skilled in the art, other data technologies that offer similar data traffic engineering features (e.g., ATM and frame relay) could be substituted for MPLS.

As illustrated, SMDN 100 has been provisioned with five primary label-switched paths (LSPs) LSP-1 to LSP-5. A label-switched path is effectively a tunnel between two nodes that carries service traffic according to a predetermined route. For example, LSP-1 is a tunnel from node N3 to node N5 that follows the path N3-N2-N5. (LSP-1 could alternatively be described by the links it traverses, i.e., L5-L4, or by the nodes and links, i.e., N3-L5-N2-L4-N5; however, for this discussion, in cases where no ambiguity will arise from the node-only notation, that notation will be used.)

An LSP is typically considered to be unidirectional; however, for clarity of illustration, each LSP in FIG. 1 is represented by a bidirectional path that could also represent the corresponding unidirectional LSP in the opposite direction. Further, each LSP may have an associated demand of any reasonable value (e.g., 2 Mbps, 10 Mbps, and 100 Mbps); however, without loss of generality, for this example, each of the LSPs in FIG. 1 is assumed to be of unit demand. Extensions to pairs of unidirectional LSPs and variable demands would be understood to one skilled in the art.

FIG. 1 illustrates the five primary LSPs as follows: LSP-1 carries traffic along path N3-N2-N5, LSP-2 carries traffic along path N4-N5-N6, LSP-3 carries traffic along path N2-N1-N4, LSP-4 carries traffic along path N2-N5, and LSP-5 carries traffic along path N2-N3-N6.

Disjoint Primary and Protection Paths

FIG. 1 also illustrates five exemplary protection paths LSP-6 to LSP-10 (also of unit bandwidth in this example) that have been reserved to use for protection of services given a failure of one of the primary paths. LSP-6 (along path N3-N6-N5) protects LSP-1, LSP-7 (along path N4-N1-N2-N3-N6) protects LSP-2, LSP-8 (along path N2-N5-N4) protects LSP-3, LSP-9 (along path N2-N1-N4-N5) protects LSP-4, and LSP-10 (along path N2-N5-N6) protects LSP-5. For clarity, in FIG. 1, the tag for each protection LSP carries a parenthetical suffix indicating the primary LSP it protects. For example, LSP-6 (P1) indicates the protection role that LSP-6 plays for primary LSP-1.

Note that the protection paths in the example of FIG. 1 are strictly disjoint from the primary paths that they protect. In this context, strictly disjoint means that the two paths in each primary/protection path pair share no common links or nodes other than their common ingress and egress nodes. Though the protection paths of this example are strictly disjoint from the paths they protect, this need not be the case in all implementations of the present invention. There will be some cases in some variants of the invention where no strictly disjoint path exists between two nodes to serve as a protection path. In other cases, other factors or constraints of the routing algorithm may lead to selection of a protection path, for a given primary path, that is not strictly disjoint from the primary path (e.g., the protection path may share some common links with the primary path). Thus, rather than being limited to strictly disjoint, the primary paths in embodiments of this invention are at least partially disjoint from their respective protection paths, where two partially disjoint paths have at least two links that are different. With this definition, a strictly disjoint path is a particular type of partially disjoint path.

A number of different mechanisms exist in the art for determination of disjoint paths between nodes given various topology and traffic information. Some exemplary algorithms are detailed in Doshi '99. Additionally, mechanisms exist for establishing primary and protection LSPs, once they are determined, e.g., simple network management protocol (SNMP) per Network Working Group, "Introduction to a Simple Network Management Protocol (SNMP) version 3," RFC2570, April 1999 (herein "RFC2570") and RSVP-TE as covered by Awduche, D., Berger, L., Gan, D., et al., "RSVP-TE: Extensions to RSVP for LSP Tunnels," RFC 3209, December 2001 (herein "RFC 3209"), each of which is incorporated herein by reference in its entirety.

Link Capacity

In the embodiment of the invention illustrated by the example of FIG. 1, to provide for full recovery of services given any single-link failure, the capacity of a link must be large enough to accommodate the primary services that it supports as well as the services it protects. For example, L5 is one link in primary service paths LSP-1 and LSP-5. It is said to "support" both of those paths. Assuming that LSP-1 and LSP-5 each carry one unit of demand bandwidth, L5 will need at least two units of allocated capacity to support those two paths. L5 is also part of the protection path (LSP-7) for service path LSP-2 (requiring an additional one unit of capacity). Thus, in this example, the capacity of L5 must be at least three units of bandwidth: two units of allocated bandwidth and one unit of reserved bandwidth.

Reservation vs. Allocation

In one embodiment of the present invention, the bandwidth associated with the protection path (LSP-7) for service path LSP-2 is not allocated in advance of a failure, but is, instead, only reserved. If the bandwidth were allocated in advance of a failure, this would correspond, in the parlance of the field of protection and restoration for optical transport networks, to a 1:1 protection scheme. If the bandwidth were not only allocated, but additionally if a copy of the service path's data were to be duplicated to the protection path; this would correspond to a 1+1 protection scheme. However, in preferred embodiments of this invention, the protection bandwidth is not allocated until after the detection of a failure. Thus, in such implementations, this unallocated bandwidth might be used for "opportunistic" data, e.g., data that has a lower guaranteed quality of service (QoS) than the protected traffic. Further, because the protection bandwidth is only reserved and not allocated, "sharing" can be supported, as defined below.

Sharing and Single Failure Coverage

Another characteristic of certain networks of this invention is termed "sharing." This refers to the facility to share reserved protection capacity on a link between more than one LSP. As described previously, the primary paths provisioned on the SMDN are assumed to be at least partially disjoint from their respective protection paths. This means that, for at least one link in each primary path, there is a detour segment in the corresponding protection path that has been designated to carry reserve capacity to protect the primary path. Recovery from a failure of a link along a primary path that has a corresponding detour segment in the protection path is achieved by switching the affected traffic at the ingress node from the failed primary path to the corresponding protection path. For a successful recovery, at the time of protection switching, enough capacity should be available on all links along the protection path. One way of achieving this is by allocating dedicated bandwidth along the protection path of each LSP. This will result in excessive use of protection bandwidth. A more efficient scheme involves sharing the protection capacity of a link between LSPs that are not generally affected by the same single node or link failure.

For example, consider the protection capacity that is set aside (i.e., reserved) on a link along the protection path to recover from a failure along a first primary path. Next assume that this link is also designated as part of the protection path of a second primary path that is disjoint from the first primary path (in this case, the second primary path would not be affected by a failure along the first primary path). Then, given the assumption that no more than one link will fail at a given point in time (a reasonable assumption given the mean-time-between-failure (MTBF) statistics of state-of-the-art networks), the two primary paths may "share" the reserved protection bandwidth of the protection link.

An example should help clarify the concept. Consider LSP-3 of SMDN 100 as the first primary path. It is protected by LSP-8, which includes L4 (i.e., L4 is a protection link for LSP-3). L4 also serves as part of the protection path (LSP-10) of LSP-5, where LSP-5 does not share any links with LSP-3 (i.e., LSP-3 and LSP-5 are disjoint). Thus, only one unit of capacity needs to be reserved on L4 to protect against a failure affecting either LSP-3 or LSP-5. LSP-3 and LSP-5 are considered to "share" this protection capacity on L4. The extension of this concept to the full SMDN is considered to be a generalized shared mesh technique. Node failures represent another basis for protection bandwidth reservation and may similarly benefit from sharing.

Worst-Case Link Protection Capacity

The amount of bandwidth reserved on a given link for protection purposes is chosen to accommodate the worst-case traffic demand that would be placed upon that link given the failure of any other one link or any one node in the network. As another example of sharing and to help clarify this concept, consider link L6 of SMDN 100.

Link L6 supports both LSP-6 and LSP-10, the protection paths for LSP-1 and LSP-5, respectively. LSP-1 includes intermediate node N2 and links L4 and L5, while LSP-5 includes intermediate node N3 and links L5 and L7. Since N2 is a terminal node of LSP-5, service protection for LSP-5 is not available in the event of a failure of N2. As such, only one unit of reserve capacity on link L6 is needed to protect LSP-1 from a failure of N2. Similarly, since N3 is a terminal node of LSP-1, service protection for LSP-1 is not available in the event of a failure of N3. As such, only one unit of reserve capacity on link L6 is needed to protect LSP-5 from a failure of N3. A failure of link L4 would result in a failure of LSP-1, creating a need for one unit of reserve capacity on link L6. Similarly, a failure of link L7 would result in a failure of LSP-5, also creating a need for one unit of reserve capacity on link L6. Since L4 and L7 are independent links, a failure of only one or the other (but not both) is all that needs to be considered. Thus, the reserve capacity required on L6 could still be capped at one unit.

However, if a failure on L5 is considered, both LSP-1 and LSP-5 are affected. Since this one failure could result in a concurrent demand of two, a "worst case" of two units of bandwidth would have to be reserved on L6 to ensure maximal recovery of the network under the assumption of a maximum of one link or node failure at time. In general, in the calculation of the reserve capacity required for each link of SMDN 100, the effect of the failure of each node and each of the other links in the network is independently considered and the worst-case capacity is reserved.

Tabulation

The concepts of the previous sections are quantified by TABLE 1 of FIG. 2. TABLE 1 shows the amount of protection capacity required on each link for recovering from every possible single link or node failure in SMDN 100 of FIG. 1. Each row of TABLE 1 corresponds to a different link of SMDN 100. For each row (corresponding to a particular link), each column entry identifies the protection capacity for that link in order to protect service in the event of a failure of the link or node associated with that column in the table. Using a table such as TABLE 1, the sharing of protection capacity between different failures can be realized.

To better understand TABLE 1, consider the first row, which is associated with link L1. The entry of "1" in the column labeled L3 for the first row indicates that there is one unit of traffic on link L3 (due to LSP-2) that would employ link L1 on its recovery route if link L3 gets impacted by a failure. Similarly, the entry of "1" in the column labeled N5 addresses the case of a failure of node N5 and its impact on link L1. The last column titled Max is the maximum value of all entries in that row. It is the amount of protection bandwidth that needs to be reserved on that link for the worst-case single failure in the network. This value for link L6, for example, is 2 units to cover the case of a failure of link L5 as discussed in the previous section (and as reflected by the entry of "2" in row L6, column L5 of TABLE 1). The other entries of TABLE 1 are determined similarly.

Completion of the information in TABLE 1 and the calculation of the Max value enable the determination of how much protection capacity to reserve on each link in the SMDN to realize full recovery of services in the SMDN in the event of a single link or node failure.

Distributed vs. Centralized Sharing Database

The information in TABLE 1 can be either maintained in a centralized fashion at a server or distributed to the nodes in the SMDN. In case of a centralized architecture, TABLE 1 might reside on a centralized server and be updated after the provisioning of each new primary and protection LSP. Signaling could be used to notify nodes of any change in the reservation bandwidth on any of their connected links.

In a preferred distributed implementation of SMDN 100, portions of the information from TABLE 1 are distributed to nodes throughout the network. In one implementation, each node calculates the amount of reserved protection capacity on each of its incident links and broadcasts that information to the other nodes in the network. For example, node N5 in SMDN 100 keeps track of the protection capacity reserved on links L3, L4, and L6. This corresponds to the information from TABLE 1 in the rows labeled with those link designations (i.e., L3, L4, and L6). Likewise, node N4 keeps track of information relevant to links L1 and L3 (corresponding to the rows labeled L1 and L3 in TABLE 1). Note that nodes N4 and N5 both keep track of information relevant to link L3. A secondary mechanism (e.g., periodic refresh or localized flooding) is used to keep the (now distributed) information of TABLE 1 current and up-to-date at the other nodes in the network. Each node can also keep track of the full network information (e.g., the complete information in TABLE 1) for use in calculation of primary and restoration paths as needed to service new bandwidth requests.

Calculation and Distribution of Sharing Database

In steady-state operation of a shared mesh data network, it is assumed that once a new demand (i.e., service request) is received at a node, a route computation routine is invoked that calculates both a primary path (also known as "working path") as well as a protection path (also known as "restoration path") for the demand. Signaling (e.g., SNMP, PNNI, or RSVP-TE signaling) is used to establish the primary path for the service and to reserve bandwidth for the protection path. The signaling along the protection path carries the information of the primary path in terms of its demand bandwidth as well as nodes and links it contains. For each of the links incident to a node in the protection path, the node updates its local reserved bandwidth database (corresponding to its portion of TABLE 1). This update involves incrementing, by the requested demand bandwidth, the value in each entry of each relevant row that corresponds to a link or node in the primary path (i.e., those links or nodes that, upon failure, would cause a disruption in a service along the primary path and thereby levy a bandwidth demand on the links in the corresponding protection path). The update also involves calculating the maximum value of each updated row. Note that a link connecting two nodes can be a downstream link for each node in different directions. It is assumed that for a particular protection path, the upstream node to the link computes and updates the sharing information (for an optical network, this may also include selection of the time slots, wavelength, and ports) and then passes this information to the downstream node so that both nodes connected to link have the same view of resources and sharing for the link. This scheme is specifically useful in cases where primary and protection paths are bi-directional.

As an example, consider the arrival of a request for shared mesh protection service between nodes N4 and N2 of SMDN 100. Assume that, at the arrival of the request, the network was in a state captured by FIG. 1 and TABLE 1 of FIG. 2. Further, assume that LSP-11 (i.e., N4-L3-N5-L4-N2) and LSP-12 (i.e., N4-L1-N1-L2-N2) are the primary a protection paths, respectively, determined to service this request. As before, signaling along the primary path is used to establish or provision the primary LSP. Also, as before, signaling along the protection path is used to carry the route information as well as the bandwidth demand (assumed in this example to be one unit) of this new service to all the nodes (i.e., N4, N1, and N2) in protection path LSP-12 for the new primary path LSP-11. As a result, rows L1 and L2 of TABLE 1 will be updated (centrally or, in the case of a distributed architecture, at nodes N4 (just row L1), N1 (both rows L1 and L2), and N2 (just row L2)). The update result is captured in TABLE 2 of FIG. 3. Note that an additional one unit of bandwidth is now needed on both links L1 and L2 to guarantee the recovery of the new connection request (LSP-11) from a failure along its working route (i.e., N4-L3-N5-L4-N2).

Note that the availability of the complete sharing-information table (e.g., TABLE 1 or TABLE 2) at each node allows for more efficient computation of primary and protection paths; however, this is not a requirement for achieving sharing. In the case of a centralized architecture, this capability comes for free, since the complete sharing-information table resides on a centralized server and may be made available to each node through a centralized command signaling structure (e.g., SNMP). In the case of a distributed architecture, similar capability can be achieved at the cost of periodically exchanging the information of the complete sharing-information table between nodes. Thus, a centralized approach provides savings in terms of this inter-nodal exchange of information, while a distributed approach provides additional robustness (e.g., the elimination of a single point of failure) and scalability.

Connection Routing and Service Set-Up Process

In one or more embodiments of the present invention, a failure along a primary path for a service is typically detected at the destination node of the service and signaled to the source node for the service. In response to this failure signal, the source node then switches traffic for the service over to a pre-established protection path that is disjoint from the primary path. The bandwidth to support the service is typically reserved (but not allocated) on the protection path at the time of the primary service setup. Note that the capacity on the restoration path, including the bandwidth reserved to support the primary path just discussed, is potentially shared among multiple other services that do not have common elements in their primary paths. Note that in case of shared restoration, the source first establishes a pre-computed restoration path and then switches the traffic to it. For achieving sharing in optical networks, one would use shared restoration as opposed to shared protection because an established optical path physically occupies resources such as time slots, wavelengths and thus does not allow their sharing until they are released by deleting the optical path.

In one embodiment of the present invention, a network manager is responsible for the determination of primary and restoration paths for services in the network such that sharing is increased and hence network cost (in terms of bandwidth or other cost elements) is decreased, network revenue is increased, and/or sufficient capacity is reserved on the restoration path to provide for reasonable robustness of the network to failures.

In a different embodiment, distributed calculation of primary and restoration paths is performed in the network elements, as opposed to centralized calculation, since it provides better scalability and reliability. Whenever a connection request arrives at a source node, a distributed element of the network manager has the task of calculating cost-efficient primary and restoration paths. To do this, the portion of the network manager associated with the source node needs information about the link states in the network. Nodes maintain local link-state information about the links incident to them. This information, along with sharing information (which can be classified as additional link-state information), is advertised, using a data network, to other nodes in the network. Hence, all nodes in the network, and ultimately the network manager (which may be a stand-alone, centralized entity, a distributed entity, or intrinsically a part of one or more of the nodes in a network), will eventually have the information on the state and sharing characteristics of all the links in the network that is needed to make the primary and restoration path calculations for this new connection. (Note that link-state information describing topology and bandwidth availability provides sufficient information to compute a legitimate pair of primary and restoration paths. The sharing information, however, additionally allows for the computation of a more efficient primary/restoration path pair). Once the paths are calculated, service is set up on the primary path, and the required bandwidth for the service's restoration path is reserved on the restoration path.

The process of reserving bandwidth on the restoration path is similar to the process of connection setup on the primary path. In particular, a reservation message is sent to along the restoration path to each of the transit (i.e., intermediate) nodes along the path. This reservation message is analogous to the connection setup message that is sent along the primary path. One difference between the two messages is that the reservation message contains not only restoration path structure information, but additionally information about: the primary path structure, while the connection setup message contains structure information about only the primary path. Using this additional information, transit nodes along the restoration path (or a regional manager that is responsible for one or more of these transit nodes) can assess whether sharing of link restoration bandwidth is possible.

Figure 4:
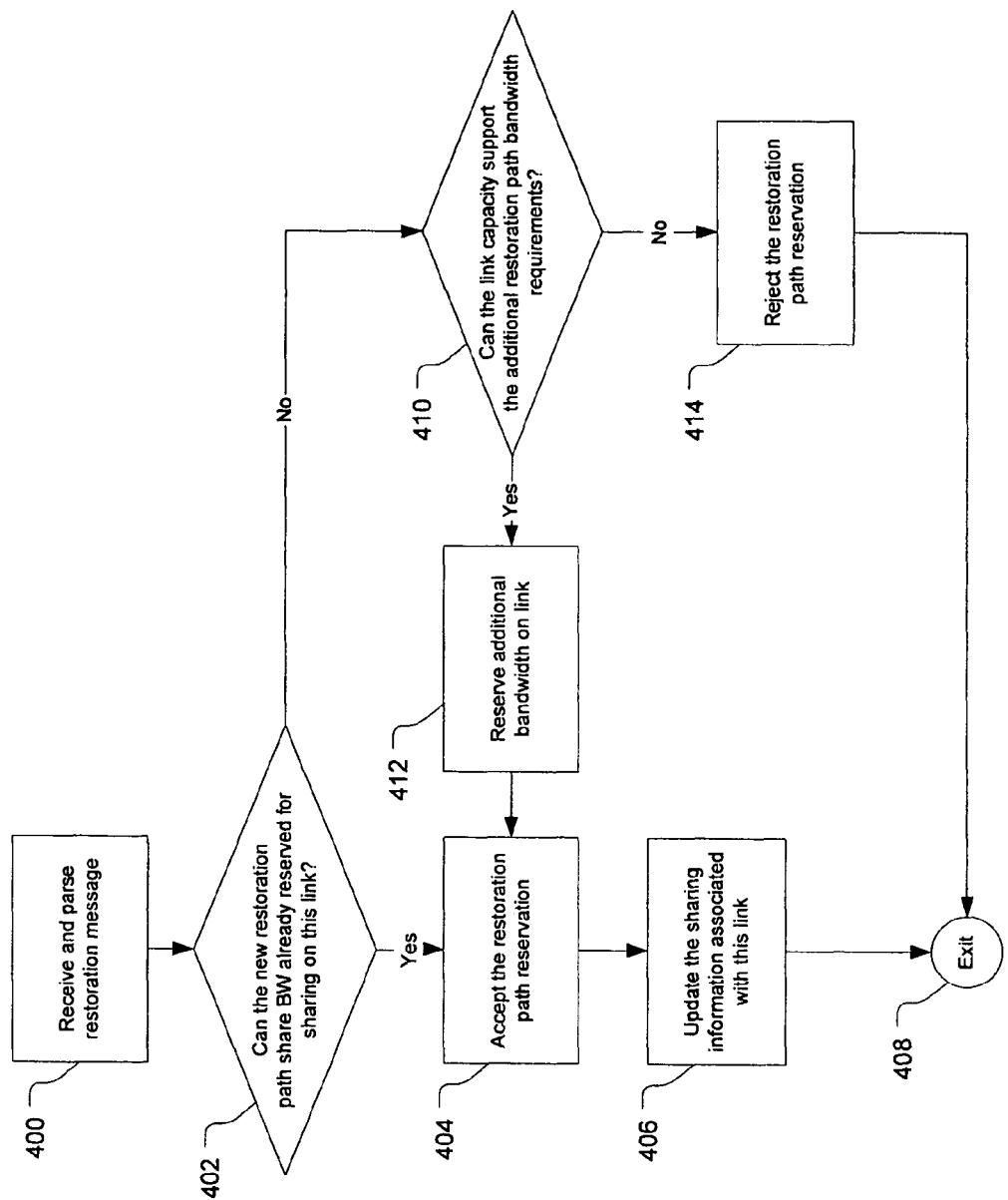
FIG. 4 depicts an exemplary restoration message processing method for source nodes and transit nodes in a mesh network.

In particular, each transit node (or its regional manager) executes a process similar to that illustrated by the flow diagram of FIG. 4 for its incident links that are part of the restoration path. Note that each node along the restoration path (including the source node) verifies, for the link connected to it in the downstream direction, whether it is possible to use already allocated restoration capacity for protecting the primary path and, if not, it allocates any additional capacity that is required on the link as long as that capacity is available. It also updates the sharing information for the link accordingly. Therefore the processing in FIG. 4 applies to all the transit nodes along the restoration path except for the destination node.

Namely, in step 400, the node receives and parses the restoration message and determines the bandwidth requirements that would be levied on the link (that is connected to it in the downstream direction along the restoration route) if there were to be a failure in one of the links that make up the primary path. In step 402, the node compares this bandwidth with the existing bandwidth requirements of primary links for which it is currently providing restoration bandwidth and determines if this new restoration path bandwidth can be shared with other restoration paths that are already reserved on the link.

If the bandwidth can be shared, then, in step 404, the node accepts the restoration path for the link. Next, in step 406, the node updates the sharing information associated with the link, and, exits the process in step 408.

If the bandwidth for the new restoration path cannot be shared, then, in step 410, the node determines whether the new restoration path bandwidth requirements can be supported by the existing capacity of the link. If it can, then, in step 412, the node reserves the necessary additional bandwidth on the link and the process proceeds to step 404 as described previously. If, in step 410, it is determined that the additional bandwidth required by the new restoration path would require an aggregate reservation of bandwidth on the link that exceeds the capacity of the link, then, in step 414, the node rejects the restoration path for the link, and, in step 408, the process exits.

Note that the above process can be performed in parallel on each of the transit nodes in the network.

For more optimal computation of primary and restoration paths in a distributed implementation, it is desirable (though not necessary) to distribute the changes in the links-state or sharing information to the other nodes in the network. However, disseminating this information for any possible change is quite expensive in terms of bandwidth and processing required. Therefore, typically, various methods are employed (e.g., based on thresholds) to limit the frequency of dissemination.

When sharing information is also being disseminated to other nodes along with the traditional link-state information, then, in addition to limiting the dissemination frequency, it is highly desirable to also address the size of the information itself. A reduction in the size of the sharing information can be achieved by using a scheme to represent the information in a compact form, by only disseminating the most critical information, or by using a combination of both.

Link-State Descriptions

In one distributed implementation of the present invention, where the computation of primary and restoration paths as well as initiation of their setup is distributed across the network, it is typical for only those nodes connected to a link to have complete visibility into the state of bandwidth allocations and bandwidth sharing on the link. Some of this information (e.g., available and currently allocated bandwidth on the link) should be distributed to other nodes in the network so they can compute primary and restoration paths. (Note that without this information the nodes may end up computing paths through congested segments of the network, thereby causing unnecessary crankbacks. This process can go in cycles and can significantly degrade network performance. Therefore, typically it is assumed that some minimal bandwidth information is disseminated to allow computation of a path through the network).

Link-state structure of traditional link-state protocols (OSPF, ISIS) has already been extended to include this necessary bandwidth information. The extensions are referred as the traffic engineering extensions (OSPF-TE, ISIS-TE).

In addition to bandwidth information, it is also desirable to exchange bandwidth-sharing information between nodes. Bandwidth sharing information allows computation of more optimal paths (e.g., that improve sharing) that can considerably reduce the required amount of restoration bandwidth, and thus the overall cost of the network. However, before employing any scheme (link-state routing, signaling, etc.) to distribute the sharing information, it is highly desirable to define compact representations of the data so dissemination of the data does not become a significant burden on the routing (OSPF-TE, ISIS-TE) and signaling (RSVP-TE, CR-LDP) protocols.

Conceptually, bandwidth-sharing information that gives the state of sharing at each link can thus be classified as link-state information. A number of different compact representations can be used to represent the sharing information in the link-state structure. These different compact representations may provide less than the full amount of information available regarding the sharing. However, beneficially, these representations take fewer bits to communicate the information used by the manager to update link-state information globally and to calculate primary and restoration paths associated with new service requests. The link-state descriptions are best illustrated in the context of a link that is part of the restoration path of a number of primary paths, such as link L5 of FIG. 5.

Figure 5:
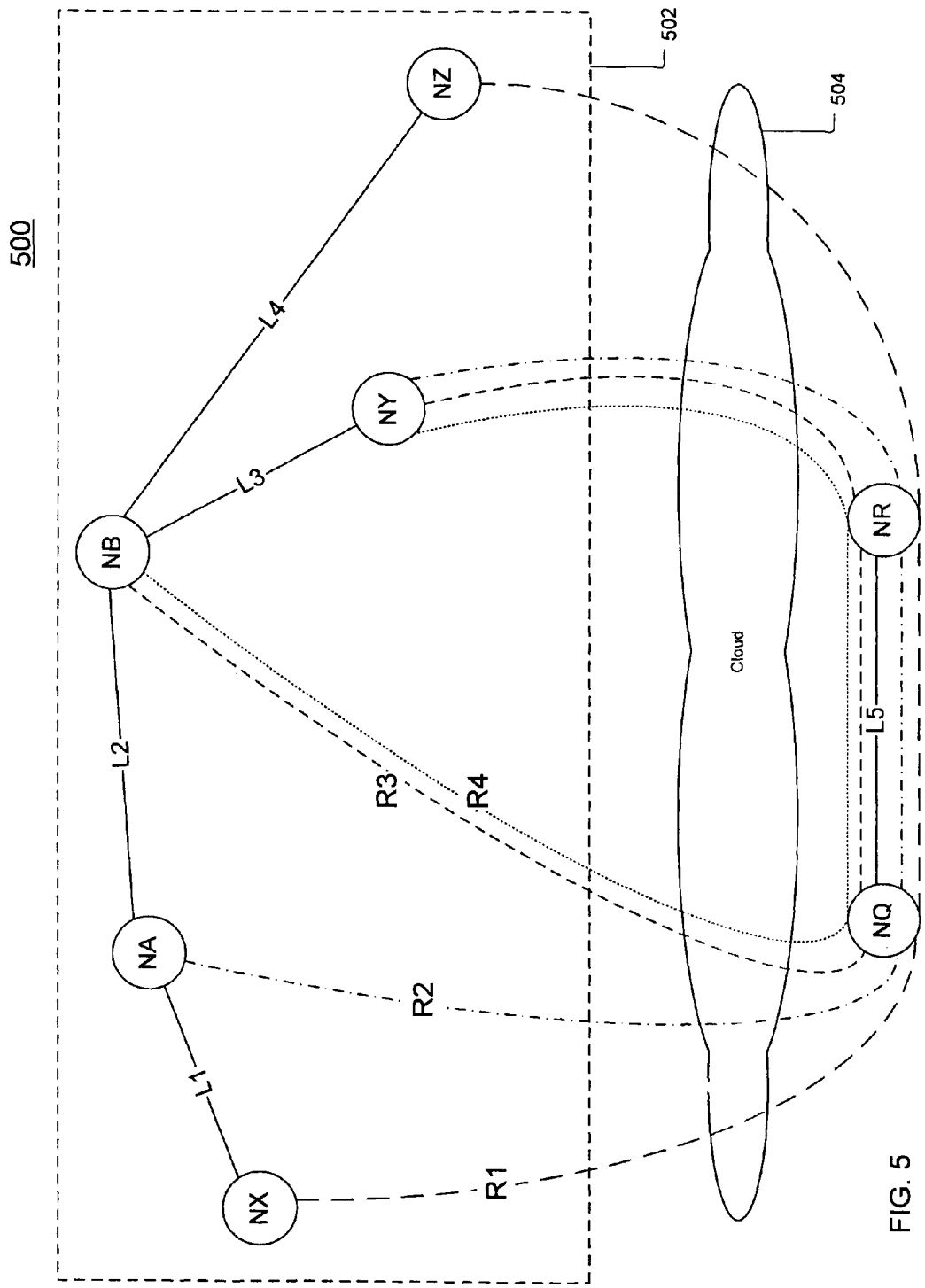
FIG. 5 depicts an exemplary shared mesh data network supporting multiple services via disjoint primary and restoration paths.

FIG. 5 illustrates exemplary network 500, which includes sub-network 502, sub-network cloud 504, and exemplary restoration-path link L5. Sub-network 502 includes nodes NA, NB, NX, NY, and NZ and links L1, L2, L3, and L4. Link L5 is bounded by nodes NQ and NR and is connected to sub-network 502 via sub-network cloud 504. The actual links connecting link L5 to sub-network 502 are not pertinent to this discussion and are thus not shown explicitly but instead are abstracted by cloud 504.

In the present example, network 500 currently supports four different services on four primary paths. The first service is between nodes NX and NZ and is carried by a primary path along L1-L2-L4. The second service is between nodes NA and NY and is carried by a primary path along L2-L3. The third and forth services are between NB and NY and they are carried by two different primary paths along L3.

The four services are protected by restoration paths R1, R2, R3, and R4. Note that each of these restoration paths includes link L5. In the following sections, various representations of the sharing information will be described using L5 as an example.

Aggregate Node-Link Vector

A first representation of the sharing information for L5 is the aggregate node-link vector representation. This representation captures minimum sufficient sharing information that is required for a link to correctly compute the amount of restoration capacity required on it to provide guaranteed restoration to an additional primary path while realizing sharing, and to correctly deduce any required release of restoration capacity on deletion of a primary path. Note that this representation is very closely related to the row representation as illustrated in TABLE 1 and TABLE 2 of FIGS. 2 and 3, respectively.

Figure 6:
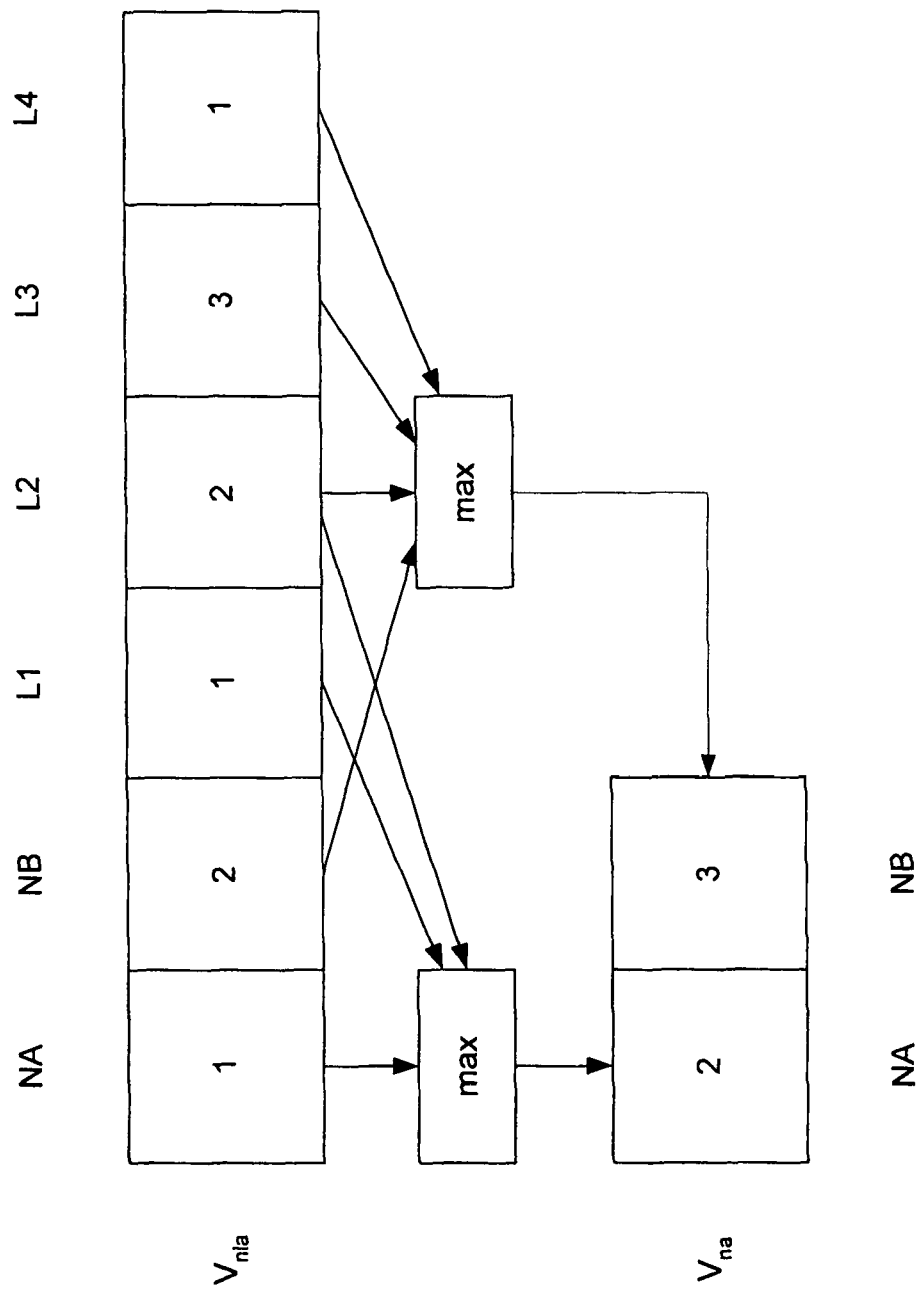
FIG. 6 depicts node-link aggregate vector and node-aggregate vector representations of sharing information.

In this representation, a vector is formed such that each element of the vector corresponds to a component in the network (e.g., a node or link) whose failure might contribute to the bandwidth reservation requirements of link L5. For the exemplary network of FIG. 5 and the four exemplary primary path services, the elements include NA, NB, L1, L2, L3, and L4. (Note that, for the present example, nodes NX, NY, and NZ are not considered as elements of the aggregate node-link vector, because they are terminal nodes (i.e., source or destination nodes) and not intermediate nodes for the four services protected by link L5.) The value in each position of the vector represents the aggregate bandwidth that would be required on link L5 in the event of a single failure in the network of the network element that corresponds to that vector position. FIG. 6 illustrates aggregate node-link vector $V_{nla}$ for link L5 associated with the exemplary network 500 of FIG. 5.

For this example, it is assumed that the bandwidth demand of each service is of unit value, however, extension to the more general case of non-unit bandwidth demands would be understood to one skilled in the art. As illustrated, the value of the vector in the position corresponding to node NA is 1. This indicates that, for a failure of node NA, an aggregate bandwidth demand of 1 (associated with protection path R1) will be placed on link L5 corresponding to one (unit bandwidth) service. Similarly, the 2 in the position of $V_{nla}$ corresponding to node NB indicates that for a failure of node NB, link L5 will be required to support two aggregate (unit bandwidth) services paths (i.e., associated with protection paths R1 and R2). Similarly, potential failures of links L1, L2, L3, and L4 correspond to aggregate bandwidth reservation values in $V_{nla}$ of 1, 2, 3, and 1, corresponding to restoration paths R1, R1+R2, R2+R3+R4, and R1, respectively. Note that the bandwidth that is reserved on link L5 is the maximum of the bandwidth requirements associated with any single network component failure. In the example network of FIG. 5, the reservation bandwidth is thus max $\{1, 2, 1, 2, 3,\}=3$.

As discussed earlier, to provide sharing, each node in the network keeps track of the aggregate node-link vector for all directly connected links. To share this information across the network (useful for computing more optimal primary and restoration paths), in one implementation, each node disseminates aggregate link-node vectors for its connected links. For a large network, this may turn out to be expensive because of the sheer size of each aggregate node-link vector. Other implementations involve sending a more compact representation of the sharing information. This compact representation, which summarizes the aggregate node-link vector information, is still useful in computing more efficient primary and restoration paths. Some of the compact representations are described in the following section.

Node-Aggregate Vector

An alternative representation of the link-state sharing information is referred to as a node-aggregate vector, designated $V_{na}$. FIG. 6 also illustrates the node-aggregate vector $V_{na}$ for link L5 of exemplary network 500 of FIG. 5 as well as its derivation from the aggregate node-link vector $V_{nla}$. As illustrated, each element of $V_{na}$ corresponds to a node in the network (although not all network nodes need to be included in $V_{na}$) and is a function of the node itself, specifically, the reservation values associated with all links incident to the node. The value 2 corresponding to node NA, for example, is derived from $V_{nla}$ by taking the maximum of the reservation values for node NA and links L1 and L2, which, as can be seen from FIG. 5, are the links incident to node NA. Similarly, the value 3 corresponding to node NB is derived from $V_{nla}$ by taking the maximum of the reservation values for node NB and its incident links L2, L3, and L4.

Binary Node-Link Vector

Figure 7:
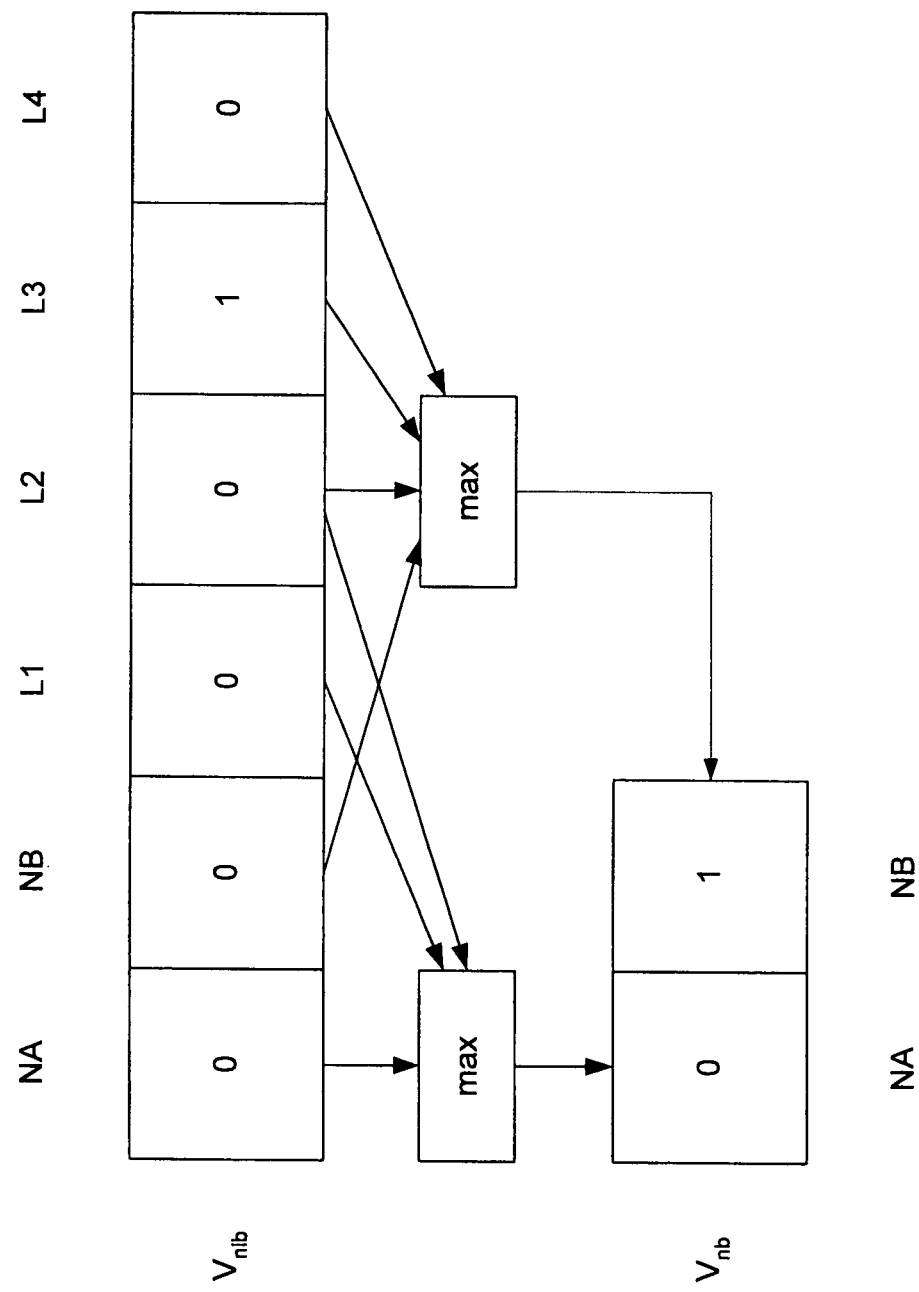
FIG. 7 depicts node-link binary vector and node-binary vector representations of sharing information.

Another alternative representation of the link-state sharing information is referred to as a binary node-link vector, designated $V_{nlb}$. FIG. 7 illustrates the binary node-link vector $V_{nlb}$ for link L5 of the exemplary network of FIG. 5. The binary node-link vector $V_{nlb}$ is created by a transformation of the aggregate node-link vector $V_{nla}$. Namely:

$V_{nlb}(j)=1$; if $V_{nla}(j)$=reservation bandwidth for the link $V_{nlb}(j)=0$; otherwise.

In other words, the binary node-link vector $V_{nlb}$ indicates which network element failure will cause activation of all the bandwidth that was reserved for restoration paths on the link. So, for example, as illustrated in FIG. 7, all elements of vector $V_{nlb}$ are zero, except for the element corresponding to link L3, since only the failure of link L3 will require all of the bandwidth (i.e., 3 units) reserved on link L5.

Node-Binary Vector

Yet another alternative representation of the link-state sharing information is referred to as a node-binary vector, designated $V_{nb}$. FIG. 7 also illustrates the node-binary vector $V_{nb}$ for link L5 of the exemplary network of FIG. 5 as well as one method for its derivation from the binary node-link vector $V_{nlb}$. As illustrated, each element of $V_{nb}$ corresponds to a node in the network (although not all network nodes need to be included in $V_{nb}$) and is a function of the node itself, specifically, reservation values associated with all links incident to the node. The value 0 corresponding to node NA, for example, is derived from $V_{nlb}$ by taking the maximum (or the binary OR) of the reservation values for node NA and its incident links L1 and L2. Similarly, the value 1 corresponding to node NB can be derived from $V_{nlb}$ by taking the maximum (or the binary OR) of the reservation values for node NB and its incident links L2, L3, and L4. Alternatively, the binary node vector $V_{nb}$ can be derived from the node-aggregate vector $V_{na}$ as follows:

$V_{nb}(j)=1$; if $V_{na}(j)$=reservation bandwidth for the link $V_{nb}(j)=0$; otherwise.

Note that $V_{nb}$ can also be derived directly from $V_{nla}$.

Other alternative representations of the link-state sharing information, including inverted binary, real-number valued, and delta representations relative to other elements of the vector or a constant, as well as compressed (e.g., entropy, Huffman, or run-length encoded) versions can be used as would be understood to one skilled in the art.

Note that the previous descriptions of vector representations of sharing information assumed a homogeneous network where all service requests are of unit bandwidth. Extension of these concepts to cases involving non-unit, real-valued bandwidths of new and existing services would be understood to one skilled in the art.

Sharing Determination and Updating Sharing Information

Figure 8:
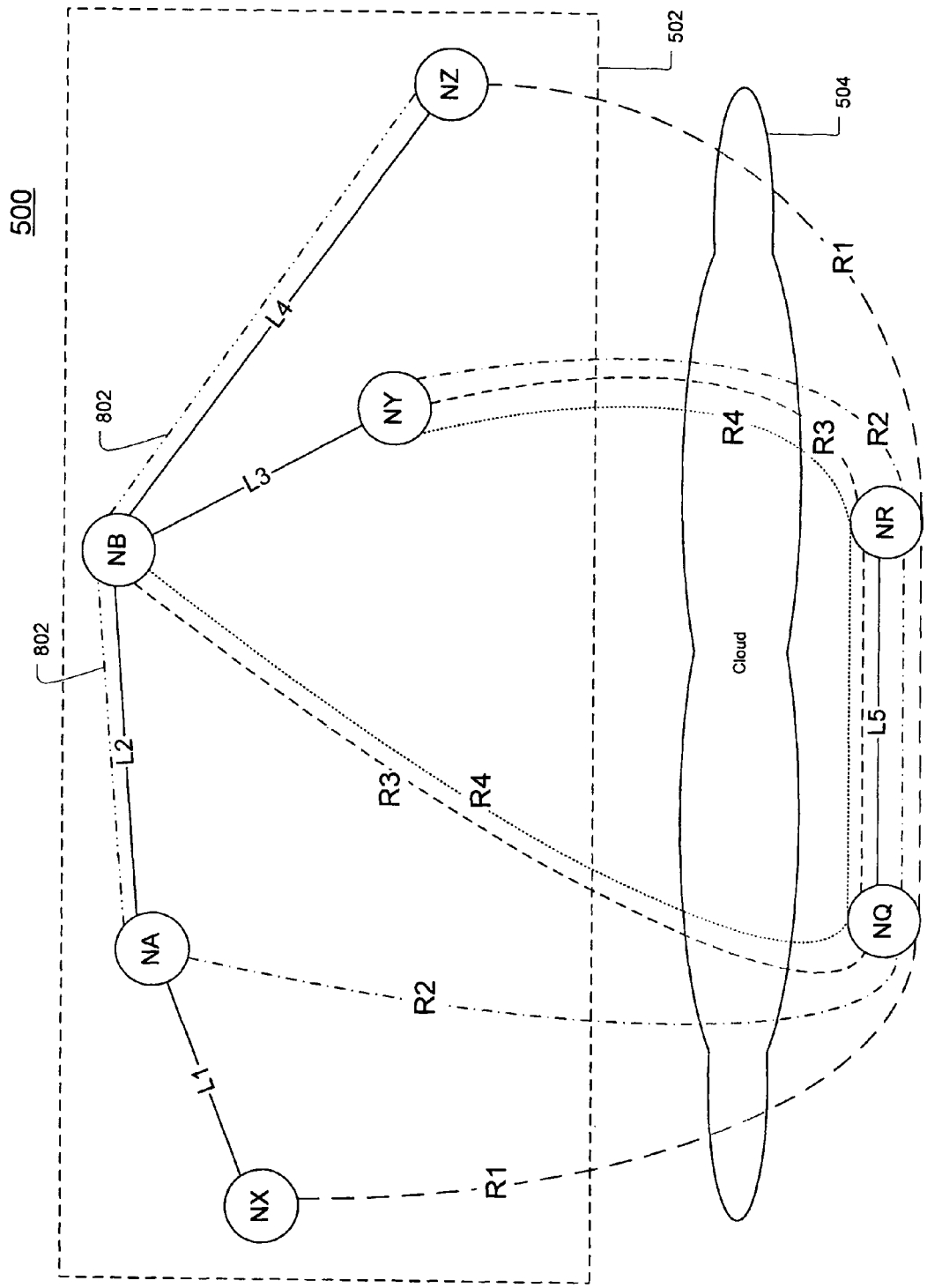
FIG. 8 depicts the exemplary shared mesh data network of FIG. 5 with an additional service added.
Figure 9:
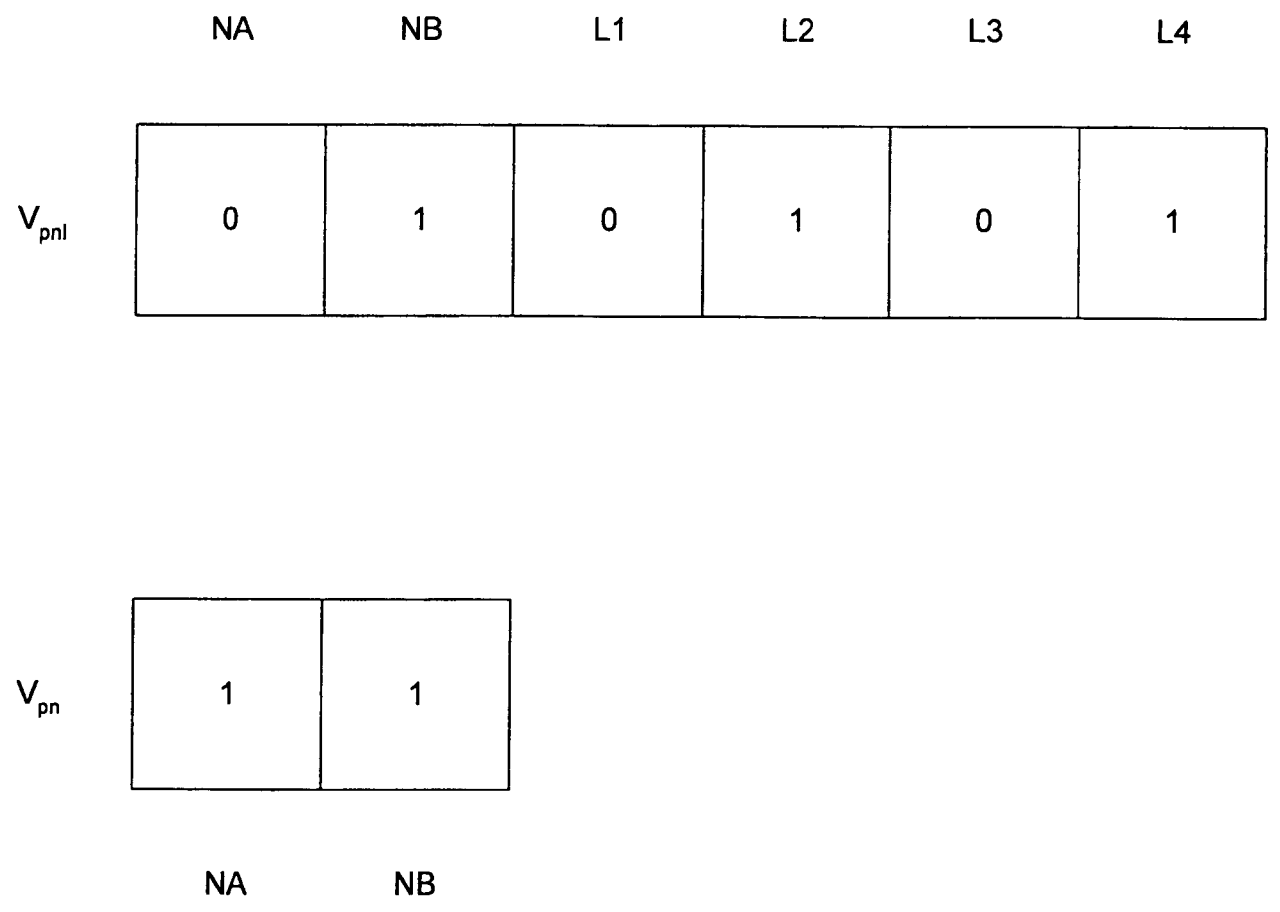

To understand the operation and use of the sharing information vectors, consider the addition of a new service to exemplary network 500 of FIG. 5 as illustrated in FIG. 8. A primary path node-link vector $V_{pnl}$ for the new service 802 of FIG. 8 is illustrated in FIG. 9. A vector element of a primary path node-link vector $V_{pnl}$ is assigned the bandwidth of the service demand if the element position corresponds to a network component that is in the primary path and a value of zero otherwise. So, the primary path node-link vector $V_{pnl}$ for new service 802 includes ones (because, in this example, we are assuming unit demands) in positions corresponding to node NB and links L2 and L4 and zeros in the other positions.

Assuming the restoration path for the new service path traverses link L5, it is of interest to determine whether this new restoration path can share the bandwidth of this target link L5 with its presently supported restoration paths.

Aggregate Node-Link

One way to make this determination is to add the primary path node-link vector $V_{pnl}$ associated with the new service path to the aggregate node-link vector $V_{nla}$ that was associated with the previous aggregate reservation on target link L5. This addition is done on an element-by-element basis to form a sum vector $V_{snl}$. The maximum value of this resulting sum vector is then compared to the current reservation bandwidth of link L5. If the maximum value is equal to the current restoration bandwidth, then the restoration path for the new service can share the bandwidth reserved for the restoration paths of the existing services. Otherwise, supporting the new restoration path will require reservation of an additional bandwidth unit. In the case of the exemplary new service 802 of FIG. 8, the sum vector $V_{snl}$ resulting from the vector addition of the primary path node-link vector $V_{pnl}$ of FIG. 9 and the aggregate node-link vector $V_{nla}$ of FIG. 6 is {1,3,1,3,3,1}, where the maximum value is three, which is equal to the current reservation bandwidth on link L5. Thus, the restoration path for this new primary path may be added to link L5 without the reservation of additional bandwidth on link L5.

The determination of whether link L5 can be shared corresponds to step 402 of the method of FIG. 4, which is performed by a node incident to link L5 after receiving a restoration path request message. Continuing this example, following this determination of the ability to share in step 402, the restoration path bandwidth is accepted (step 404) and the sharing information associated with link L5 is updated (step 406). This updating is done by setting the updated aggregate node-link vector $V_{nla}^u$ equal to the sum vector $V_{snl}$ or, in other words $V_{nla}^u = V_{nla} + V_{pnl}$. A subsequent determination of sharing ability for link L5 would then be performed using $V_{nla}^u$.

To calculate, in an optimal way, the primary and restoration paths at the source node, one could advertise sharing information in the network using the aggregate node-link vector form or one of its compact representations so that each node would have information about which links can share the restoration bandwidth. Note the compact representations only provide a summary of the sharing information.

Computation of Routes Based on Multiple Cost Criteria

The link state information (bandwidth allocation) and sharing information as outlined previously can be used to compute cost-efficient connection routes within a network. For path computation, link state can be reduced to an equivalent link cost and then route-computation algorithms can be considered that minimize the total path cost—where the path cost is considered to be the sum of the link costs. The link-cost function should be carefully designed. Also, depending on the possibility of sharing bandwidth on the restoration path, link costs will be different for the sharing case compared to the no-sharing case. (Note in case of sharing case, sharing information can be used to compute more cost-efficient paths through the network. This can be achieved by incorporating sharing information in the link-cost metric). The two cases are described below.

No-Sharing Case

Link-cost calculation is based on the administrative weight (AW) of the link, the link capacity (LC), and link's available capacity (AC). Under light and medium link utilization (LU), where LU is less than a specified utilization threshold (UT)

(i.e., LU≦UT), link cost when sharing is not considered $w^{NS}$ is set equal to the AW, i.e., $w^{NS}$=AW. Hence, under light load conditions, the link-calculation algorithm will assign links to services according to the preferences (i.e., administrative weights) assigned by the network operator. When the link load is high (LU>UT), however, the link weights are preferably calculated with the objective of load balancing and revenue maximization. The generic formula for the link cost $w^{NS}$ in this high link utilization region is based on the inverse of available capacity:

$$w^{NS} = \frac{AW \cdot MWC}{AC^f} \quad (1)$$

where MWC is maximum weight coefficient (i.e., an additional scaling factor introduced to provide continuity between the two regions of light and heavy loads) and f is an exponentiation factor (nominally set to 0.4) used to modify the available capacity variable AC. Motivation, a detailed model, and additional numerical support for this approach of weight calculation based on the inverse of available capacity are described in Dziong, Z., "ATM Network Resource Management," McGraw-Hill, 1997, (herein "Dziong '97") incorporated herein by reference in its entirety.

Sharing Case

When sharing information is available, it can be used to compute more cost-efficient (more optimal) primary and restoration paths. For example, an algorithm can be designed to compute, for each possible primary path, the lowest-cost restoration path by utilizing the sharing information. Then, from the set of all primary and restoration paths, the pair that requires the least amount of additional capacity can be chosen. This path computation algorithm using the sharing information can give considerably better paths than an algorithm using no sharing information.

Sharing information can be used in finding the least-cost restoration path for a given primary path. It involves adjustment of the link cost (lowering of it) based on the amount of sharing that is possible on a link along the restoration path of a particular primary path. This can be achieved by computing the sharing degree of each link in the network given the primary path. (Note that only links that are disjoint to the primary path need to be considered).

The sharing degree is defined as the maximum number of additional (unit bandwidth) primary services (along the proposed primary path) that can be added to the link without increasing the restoration bandwidth requirement of the link. In a sense, this metric provides a network planner with an idea of the restoration headroom on a link with respect to the proposed primary path. The higher the sharing degree, intuitively, the better the choice of the primary path for the new service, since a larger sharing degree for a primary path would allow future demands to be added along that path without the need to reserve additional restoration bandwidth.

Sharing degree can be calculated from the aggregate node-link vector $V_{nla}$ representation of sharing information and the primary path node-link vector $V_{pnl}$ representation according to the following relationship:

SD=the maximum value m for which max $\{m \cdot V_{pnl} + V_{nla}\}$=RB, where RB is the current reservation bandwidth on the link under consideration.

A less accurate measure of sharing degree can be calculated using the compact representations of the aggregate node-link vector. Note that less accurate means that the sharing degree provides a conservative indication of which links may be better, but does not provide the exact bandwidth available for sharing for a particular primary path.

Sharing degree can be calculated from the node-aggregate vector $V_{na}$ representation of sharing information and the primary path node vector $V_{pn}$ representation according to the following relationship:

SD=the maximum value m for which max $\{m \cdot V_{pn} + V_{na}\}$=RB.

Sharing degree can also be calculated using the binary representation of node-link or node vector. In case availability of sharing information in terms of the binary node-link vector $V_{nlb}$ for a link, the sharing degree can be computed by first deriving a binary primary path node-link vector $V_{pnlb}$ from the primary path node-link vector $V_{pnl}$ (in the similar fashion that $V_{nlb}$ can be derived from $V_{nla}$), then taking an AND of the $V_{pnlb}$ (binary primary path node-link vector) and $V_{nlb}$ (binary node link vector representation of the sharing information on the link), and then taking the bit OR of the resulting vector. If the result is one, sharing is not possible and sharing degree is zero. If the result is zero, then sharing is possible and sharing degree is one Note that the sharing degree obtained in this manner using the binary node-link vector does not give the exact amount of sharing that is possible on the link for the primary path. It only indicates whether sharing is possible or not.

Similarly, a more crude sharing degree can be derived by using the binary node vector information.

When bandwidth sharing is possible for a link, it would appear that there is no immediate bandwidth-related cost for new restoration path reservation using that link. However, when applying the Markov decision theory framework described in Dziong '97, there is a cost. This follows from the fact that the cost should be considered during the whole connection-holding time, not just at the instant of a new connection arrival. The Markov process makes it possible to consider the probabilistic cost of using the link, since, even if sharing is possible at the moment of connection arrival, in the future, with some probability, the other shared connections can be terminated and the new connection will be the sole occupant of the reserved bandwidth on that link, and hence incur a cost for reserving additional restoration bandwidth in the network. While exact calculation of such a cost seems to be very difficult, if possible, one can use this argument to employ a non-zero link cost even when sharing is possible. In one implementation, this fact can be accommodated by calculating link cost according to the following equation:

$$w^S = \frac{w^{NS}}{(1 + b \cdot SD)} \quad (2)$$

where $w^S$ is the link cost considering sharing degree, $w^{NS}$ is the link cost without considering sharing degree, and b is a specified coefficient.

Figure 10:
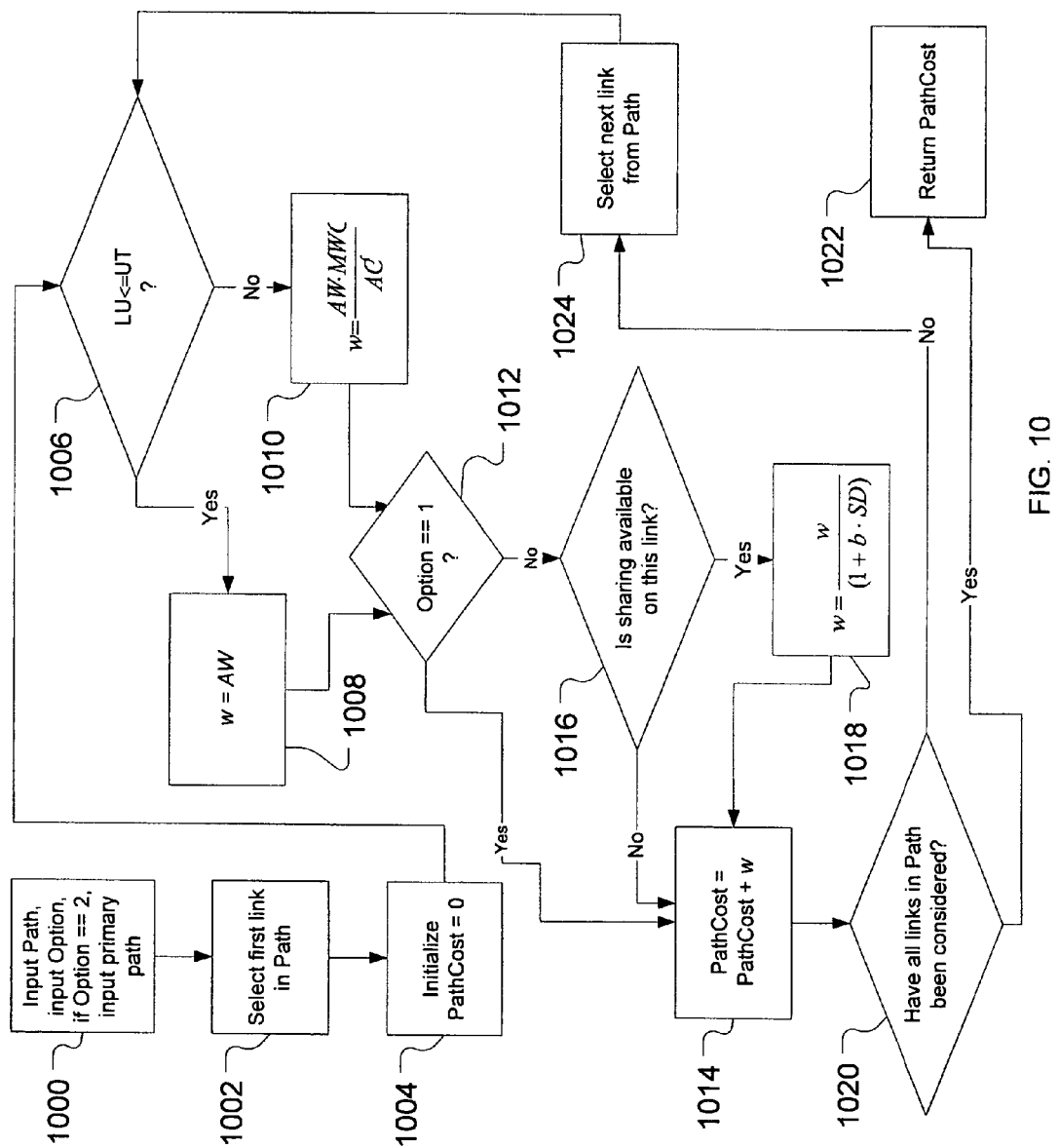
FIG. 10 illustrates a routine for calculating the link cost as a function of sharing and link utilization.

FIG. 10 depicts an exemplary procedure for calculating a path's cost as a function of link utilization and sharing (assuming the path is a restoration path) as per the above discussion. As illustrated, in step 1000, the procedure inputs Path (e.g., the link IDs for a path), Option (Option=1 if the path cost is to be calculated without consideration of whether sharing is available or not, and Option=2 if sharing is to be considered), and additionally a primary path if Option=2 (since sharing is a function of a path relative to the primary path that it protects). Next, in step 1002 the first link in Path is selected for cost assessment. The variable PathCost is initialized to zero in step 1004, and in step 1006, a test is performed to determine if the link utilization is below a specified utilization threshold. The utilization threshold (UT) for the system is determined by analysis and nominally set to 80%. If the utilization is below or equal to the threshold, then in step 1008, the link cost is set to AW. If the link utilization is above the threshold, then in step 1010 the link cost is set according to equation 1. In either case, in the test of step 1012, the variable Option is checked to see if it is set to the no sharing option. If it is, in step 1014, the PathCost is incremented by the link cost. If Option !=1 (e.g., the "consider sharing" option), then in step 1016 a test is performed to see if sharing is available on this link. If it is, then in step 1018, the link cost is assigned a value according to equation (2) (where it is a function of the link cost calculated for the no-sharing option and the sharing degree calculated using the primary path that was passed to the procedure) and in either case (whether sharing is available or not on the link) in step 1014, PathCost is incremented by the new link cost. Next, in step 1020, a test is performed to determine whether all the links in Path have been processed. If they have, in step 1022, PathCost is returned to the calling procedure, if not, in step 1024, the next link is selected from Path and step 1006 the processing continues with the link utilization test as described previously. The path cost procedure of FIG. 10 can thus be seen to calculate a path cost of a primary path or a restoration path (if a reference primary path is provided in the latter case). It can also be used to calculate a path cost with consideration of sharability of links in a path (Option=2—only applicable to restoration paths with respect to a given primary path) or without consideration of the sharability of a link.

Figure 11:
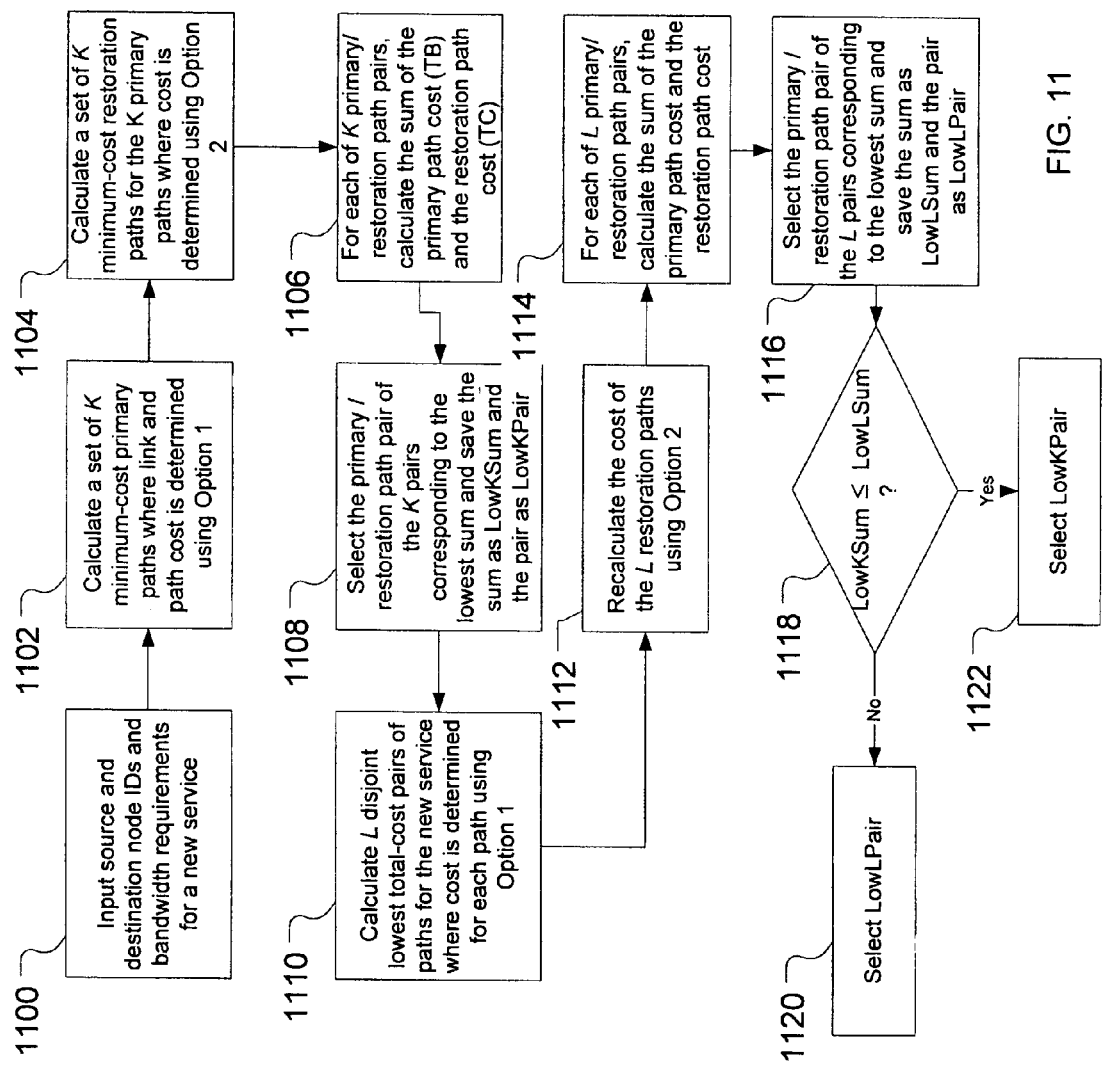
FIG. 11 depicts an exemplary method for calculating a minimum-cost primary/restoration path pair for a new service in consideration of link utilization, utilization threshold, administrative weight, and sharing degree.

FIG. 11 depicts an exemplary method for calculating a minimum-cost primary/restoration path pair for a new service in consideration of link utilization, utilization threshold, administrative weight, and sharing degree. As will be seen, FIG. 11 can make use of the procedure illustrated by FIG. 10 to calculate the path cost in certain steps. As depicted, in step 1100, the bandwidth and source and destination IDs for a new service are input. The method involves two major flows. In the first flow, illustrated by steps 1102, 1104, 1106, and 1106, one minimum-cost path pair is selected from K candidate pairs by a first method. In the second flow, illustrated by 1110, 1112, 1114, and 1116, one minimum-cost path pair is selected from L candidate pairs by a second method. Then in step 1118, and steps 1120 or 1122, the lowest-cost pair of these two lowest-cost results is selected as the overall minimum-cost pair.

Specifically, in step 1102, the first flow starts with selection of K minimum cost primary paths with the assistance of the PathCost routine of FIG. 10 using Option=1 (i.e., no sharing considered). Next in step 1104, a set of K minimum-cost restoration paths are calculated and priced using the assistance of the PathCost routine of FIG. 10 using Option=2 (e.g., where sharing is considered and the appropriate primary path is passed to the PathCost routine). Then, in step 1106, the PathCosts that were calculated in steps 1102 and step 1106 are used in the calculation of a sum of the pair cost for each of the K primary/restoration path pairs. In step 1108, the minimum sum is saved in the variable LowKSum and the minimum-cost pair is saved in the data structure LowKPair.

In step 1110, the second flow starts with the calculation of L disjoint lowest total-cost pairs of paths for the new service where cost is determined for each path using the PathCost routine of FIG. 10 with Option=1 (e.g., no sharing considered). Next, in step 1112, the cost of each of the L restoration paths that were determined in step 1110 is recalculated using the PathCost routine, this time with Option=2 (e.g., sharing considered) and the appropriate primary path passed to the routine. Next in step 1114, the sum is calculated of the cost of the primary and the restoration path for each of the L pairs and in step 1116, the lowest sum is stored in the variable LowLSum and the lowest-cost pair is stored in the data structure LowLPair.

Finally, in the test of step 1118, LowKSum is compared to LowLSum. If LowKSum is lower than or equal to LowLSum, then in step 1122, LowKPair is selected as the minimum-cost path pair. If it is not lower, then in step 1118, LowLPair is selected.

Disjoint Path Calculations

When sharing is not permitted (e.g., when a 1+1 restoration scheme is the best option available for restoration) or not considered until after calculation of the restoration path, the link costs for primary and restoration paths are considered to be the same, and both paths can be calculated using a minimum-cost node-link disjoint optimal algorithm. This algorithm for N disjoint shortest-path calculations is a special case of the "successive shortest-path algorithm," independently developed by Jewell, Iri, and Busaker and Gowen. More information on the successive shortest-path algorithm can be found in W. S. Jewell, "Optimal flow through networks," Technical Report 8, Operations Research center, MIT, 1958; M. Iri, "A new method of solving transportation-network problem," Journal of the Operations Research Society of Japan, 3:27-87, 1960; and R. G. Busaker and P. J. Gowen, "A procedure for determining a family of minimum cost network flow-patterns, Technical Report 15," Operations Research Office, Johns Hopkins University, 1961, each incorporated herein by reference. This algorithm can be implemented in several different ways with varying complexity. One of the well-known implementations was derived by Suurballe in J. W. Suurballe, "Disjoint paths in a network," Networks, pp. 125-145, 1974, incorporated by reference herein in its entirety. A slightly different version of this algorithm is well described in J. W. Suurballe and R. E. Tarjan, "A Quick Method for Finding Shortest Pairs of Disjoint Paths," Networks, Vol. 14 (1984) 325-336, incorporated by reference herein in its entirety, for two disjoint shortest-path calculations.

When sharing is taken into account during the path calculation, the link costs for restoration paths are a function of the primary path (via the sharing degree) as indicated by Equation (2). The situation is similar when taking into account shared risk link groups (SRLGs). An SRLG is a set of two or more links, for which a failure of any one link in the SRLG is associated with a relatively high risk of failure of the other links in the SRLG (e.g., having a risk of failure of the other links in the SRLG greater than a specified risk threshold). For example, when different links correspond to different optical fibers and two or more optical fibers are physically bundled together, there is a shared risk that all of those links will fail together, e.g., as a result of a cut in the bundle. Such a set of links may be said to form a shared risk link group. When considering SRLGs, each link that is part of the same SRLG as a link in the primary path is assigned a cost that is a function of its membership in that group.

In general, in calculation of minimum cost primary/restoration paths for both SRLG and non-SRLG cases, the optimal solution is not feasible in a reasonable time. Therefore, an efficient heuristic may be used that includes the following steps:

1) Create an "intelligent" sequence of potential primary paths for a new service (K minimum cost paths and L disjoint path pairs).

2) For each primary path, calculate a node-link disjoint (or SRLG-disjoint as specified) shortest restoration path.
3) Select the minimum-cost pair of disjoint paths.

Consideration of Shared Risk Link Groups

Consider a communications network consisting of nodes and links interconnecting those nodes. Each link is at a minimum characterized by its bandwidth expressed in bandwidth units. In general, each connection or service in the network is carried by a primary path that (1) connects the source and destination nodes and (2) provides the necessary bandwidth for the service.

Primary/Restoration Paths: Disjoint for Protection

Some of the services can be protected against a single transit node or link failure. This protection is made possible by selecting a protection or restoration path for the service that is node and link disjoint from the primary path except for the source and destination nodes. Whenever one of the primary path elements fails, the connection is switched automatically to the restoration path.

Primary Paths: Disjoint for Sharing

With the assumption that a restoration path is selected to be disjoint from its primary path, it can be seen that the bandwidth of a link that is part of multiple restoration paths can be shared if the primary paths (that are protected by the multiple restoration paths) are node and link disjoint from each other. This is because, when the primary paths are disjoint, a single network element failure is unlikely to impact two different primary paths. Thus, in the event of a failure, only one restoration path (from the considered set that shares bandwidth on the link) will be activated and only the bandwidth associated with that restoration path will be allocated.

Primary/Restoration Paths: SRLG-Disjoint for Protection

If shared risk link groups (SRLGs) are considered, where there is an increased risk of multiple failures within each SRLG (e.g., disjoint links that are bundled within the same share a common, a further restriction can be considered. In determining a restoration path for a primary path, no element (e.g., node or link) of the primary path should be from the same SRLG as an element of the restoration path, since, if it were, a failure of an element of the primary path might be coincident with a failure of an element of the restoration path and recovery would be hampered. Herein, paths that meet this broader type of disjointedness will be referred to as SRLG-disjoint.

Primary Paths: SRLG-Disjoint for Sharing

Similarly, with the assumption that a restoration path is always selected to be SRLG-disjoint from its primary path, it can be seen that the bandwidth of a link that is part of multiple restoration paths can be shared if the primary paths (that are protected by the multiple restoration paths) are SRLG-disjoint from each other. This is because, when the primary paths are SRLG-disjoint, a single network element failure is unlikely to impact more than one of them. Thus, in the event of a single failure, only one restoration path (from the considered set that shares bandwidth on the link) will be activated and only the bandwidth associated with that restoration path will be allocated.

Method of Calculation of Primary and Restoration Paths

Figure 12:
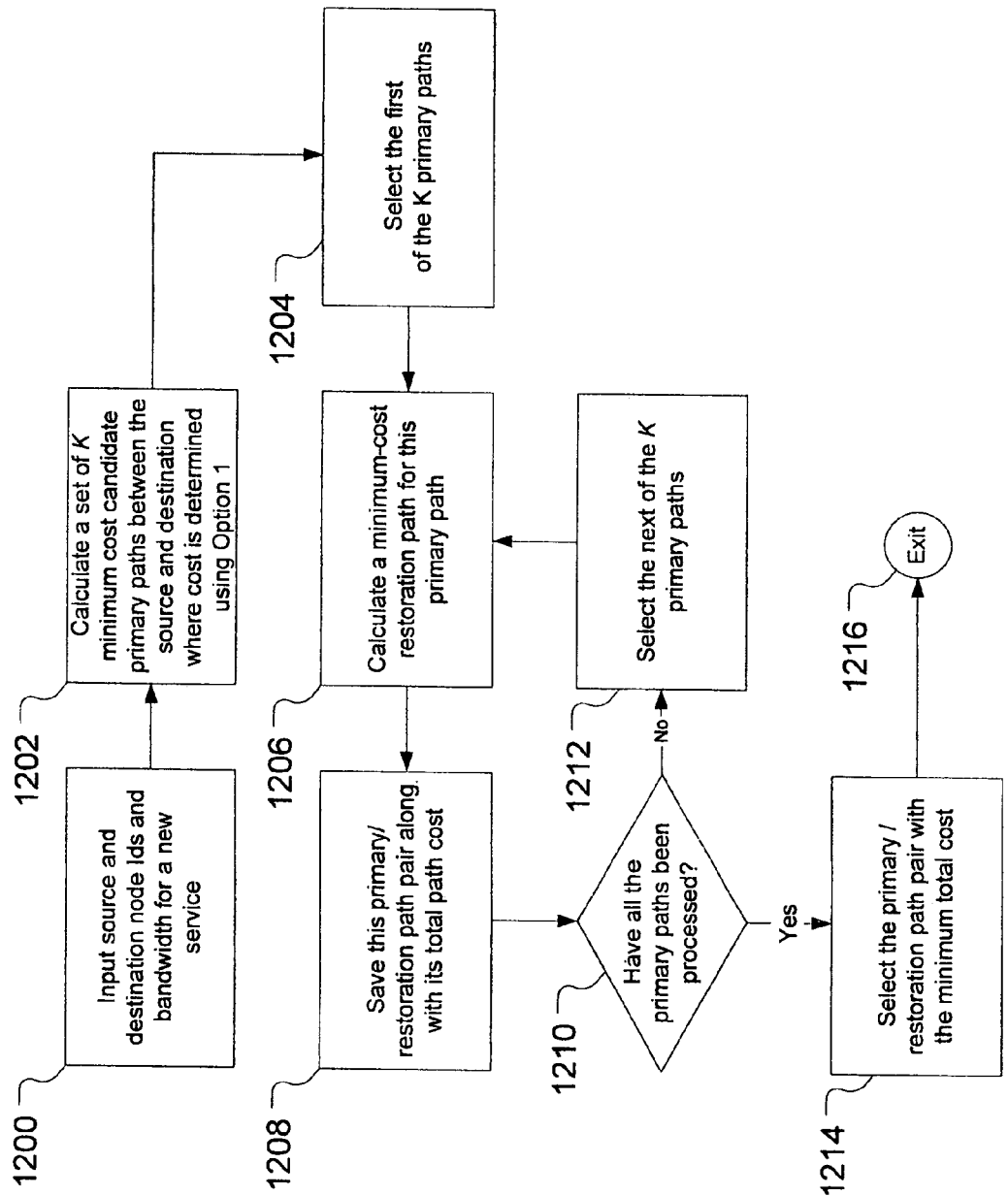
FIG. 12 illustrates one exemplary method for calculating primary and restoration paths that takes into account bandwidth sharing for restoration paths and considers the impact of shared-risk link groups (SRLGs).

FIG. 12 illustrates one exemplary method for calculating primary and restoration paths that takes into account bandwidth sharing for restoration paths and considers the impact of shared risk link groups (SRLGs). Note that this procedure may also be used for calculation of primary and restoration paths when no SRLGs are considered by considering that each link as an independent SRLG.

Figure 13:
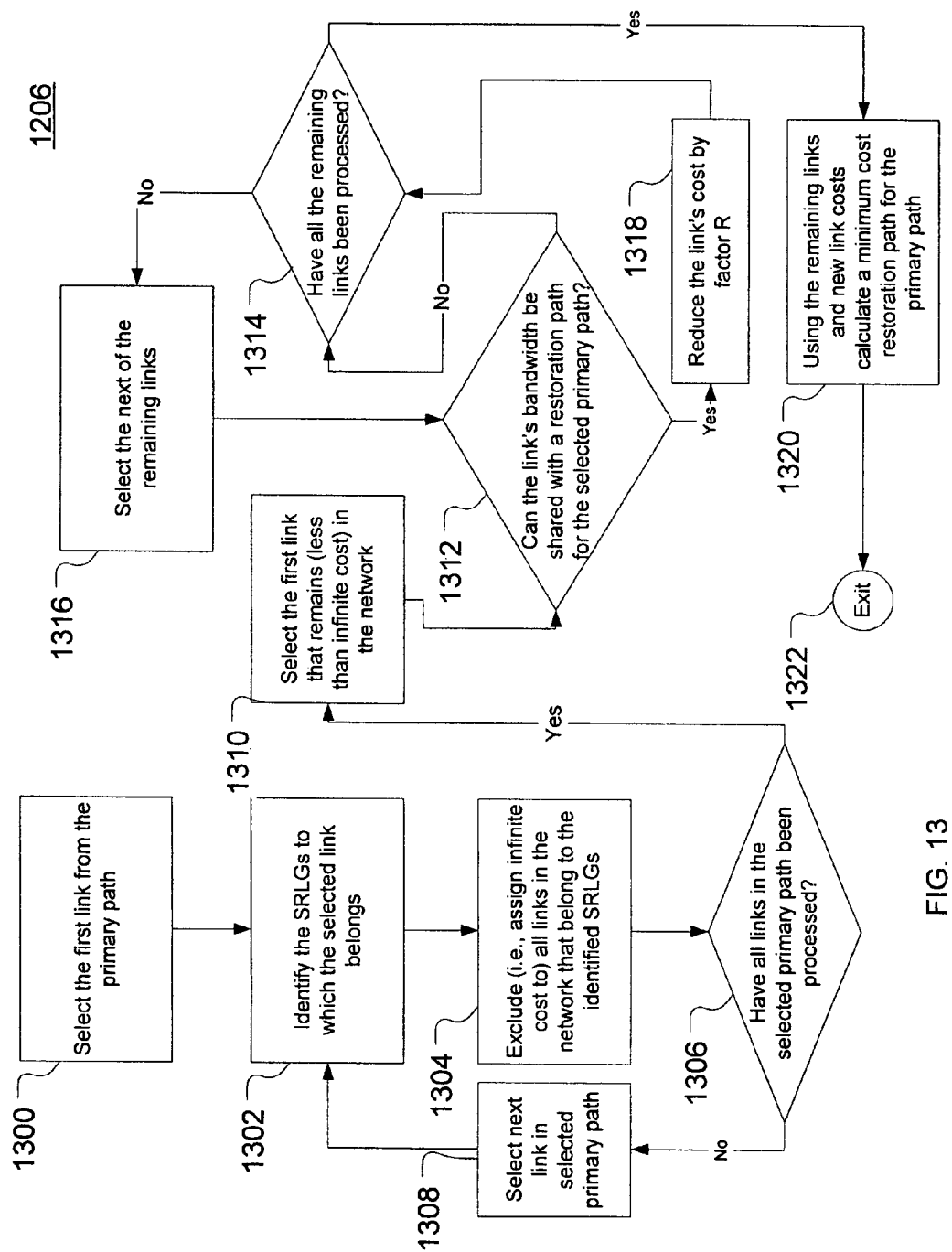
FIG. 13 illustrates an exemplary approach to implementing step 1206 of the method of FIG. 12.

As shown, in step 1200, the source and destination nodes for a new service are input. Next, in step 1202, a set of K shortest-path candidate primary paths are calculated (this can be done, for example using the PathCost routine of FIG. 10 with Option=1). In step 1204, the first of the K primary paths is selected for further processing. In step 1206, a minimum-cost restoration path is calculated for this primary path. This calculation could be performed using the routine of FIG. 10 (relevant for the non-SRLG case), but alternatively, in this embodiment of the present invention, the procedure illustrated by FIG. 13 is preferably used, since it specifically addresses link cost as a function of SRLGs. The procedure of FIG. 13 is discussed in more detail below. In step 1208, the sum of the primary path cost (calculated in step 1202) and the minimum-cost restoration path cost (determined in step 1206) is stored along with identification of the minimum-cost pair. In step 1210, a test is performed to see if all of the K primary paths were considered. If not, in step 1212, the next primary path from the group of K is selected and processing returns to step 1206. If, in the test of step 1210, it is determined that all the primary paths have been processed, then, in step 1214, all the primary/restoration path pairs that were saved in step 1208 are analyzed to find the pair with the minimum total cost of primary and restoration paths. The procedure exits at step 1216.

While one or more innovations of the present invention are used to assign a cost to a path, one approach to calculating the candidate paths themselves that are assigned costs per step 1202 of FIG. 12 is described in Brander, A. W., Sinclair, M. C., "A Comparative Study of k-Shortest Path Algorithms," Proceedings of the 11$^{th}$ 1216 Performance Engineering Workshop, Liverpool, September 1995, pp. 370, which is incorporated herein by reference in its entirety.

Calculating the Minimum-Cost Restoration Path for a Primary Path

As noted earlier, step 1206 of FIG. 12 calculates a minimum-cost restoration path for a given primary path. An exemplary procedure for implementing step 1206 of FIG. 12 is illustrated by FIG. 13. As shown, in step 1300, the first link of the candidate primary path is selected and, in step 1302, the shared risk link group(s) to which this link belongs are identified. Next, in step 1304, the links in those SRLGs are excluded from further consideration by either eliminating them from the network graph or, equivalently, assigning an infinite cost to them. In step 1306, a test is performed to determine whether all the links in the primary path have been considered. If not, in step 1308, the next link from the primary path is selected and the procedure continues in step 1302 with the identification of the SRLGs to which the new link belongs.

If the test of step 1306 is true, and all the links for the current primary path have already been considered in step 1304, then, in step 1310, the first link of the remaining links in the network is selected for further processing. In step 1312, a test is performed to determine whether the link's bandwidth can be shared with a restoration path for the selected primary path. Note that step 1304 guarantees that the links considered in step 1312 are already SRLG disjoint from the primary path. So, as discussed previously, the sharing determination includes determining whether the link is already being shared, to what extent, and by what restoration paths. Note that this determination is assisted by the sharing information that is disseminated to the nodes. If sharing is not possible, then, in step 1314, a test is performed to see if all the remaining links have been considered for sharing. If not, then, in step 1316, the next link of the remaining links is selected and the procedure continues with the test of step 1312.

If the test of step 1312 determines that sharing is possible, then, in step 1318, the cost of the sharable link is reduced by multiplying the link's current cost by factor R (nominally 1/100) and the procedure continues with the test of 1314, where the determination is again made as to whether all the links from the "remaining links" set have been processed. If they have, then, in step 1320, a minimum-cost restoration path for the primary path is calculated using the new link costs. The procedure exits at step 1322.

Note that, here, bandwidth cost is typically being considered; however, in the more general case, other costs (e.g., administrative weight and link utilization) can be considered independently or via a multiple criteria function.

In general, path selection is a powerful tool that can be used to achieve several objectives such as network operator policies (e.g., preferences for certain links and/or priorities for certain demands), maximization of network resource utilization, and optimization of different restoration strategies. Each of these objectives is based on different input parameters and optimization models. For example, operator policy can be implemented by means of demand-dependent link administrative weights and shortest-path algorithms that minimize the administrative weight of the path. Maximization of network utilization can be achieved by using current link bandwidth utilizations in a path selection algorithm to achieve load balancing in the network. Different restoration strategies can be achieved by modifying network topology and link-cost functions in the process of path selection in order to achieve optimal restoration paths that can minimize restoration time and take into account SRLGs. One or more of these objectives can be combined into a unified framework. The framework can be decomposed into three main parts, each of which is concerned with the calculation of primary and shared restoration paths:

(1) Choice of the link-state description.
(2) Choice of the link-cost function used for calculation of primary and restoration paths.
(3) Choice of the algorithm for disjoint paths calculation.

For the purpose of primary path calculation, the advertised link-state description typically will contain administrative weight AW, available capacity AC, and total link capacity LC. This information supports calculation of the state-dependent link-cost function, which is then used to calculate minimum-cost primary paths. For the purpose of sharing link bandwidth by restoration paths, the node controlling the link is provided with an accurate but optimized representation of the sharing information.

Connection Set-Up Protocol Extension

Historically, protection bandwidth for networks was allocated at the time of the primary service setup. An example of this is the popular 1+1 protection scheme, wherein the bandwidth allocated along the protection path for a service was the same as the bandwidth allocated along the primary path for a service. In this case, the connection setup protocol was substantially identical at nodes along the primary and restoration paths, as was the information that was needed at those nodes. In particular, in order to set up a service connection between incoming and outgoing links of a transit node in the prior art, the identity of the incoming service, identity of the outgoing link, and the connection bandwidth required by the service were provided. Additionally, procedurally, this same information was provided to nodes along the primary and protection paths, and the protection bandwidth was allocated on the protection path at the time of establishment of the service on the primary path.

In one or more embodiments of the present invention, however, where sharing of link bandwidth is considered, additional sharing information is provided to transit nodes along the protection path during a pre-setup of the network. This sharing information is used by the transit nodes along the protection path to determine the amount of bandwidth to be reserved along the outgoing protection links of the transit node to support protection of a new service taking into consideration link sharing. Specifically, in the connection setup protocol, the identity of the incoming service, identity of the outgoing link, connection bandwidth required by the service, and primary path link information are provided to transit nodes along the protection path, while transit nodes along the primary path still receive the same information as in the prior art. In one or more embodiments of the present invention, the primary path link information can be provided using the primary path node-link vector $V_{pnl}$ representation, or, less optimally, the primary path node vector $V_{pn}$ representation, as described previously.

In addition, in embodiments of the present invention, bandwidth is not allocated on the links of the protection path, but instead is just reserved on the links and allocated only in the event of a failure along one or more of the primary paths that are protected by the links. For this reason, the protection path is often referred to as a restoration path.

The primary path information, together with the bandwidth requirement of the new service, provide sufficient information for the transit node to calculate whether bandwidth sharing is possible and what the total bandwidth requirement is for bandwidth reservation on the link.

Figure 14:
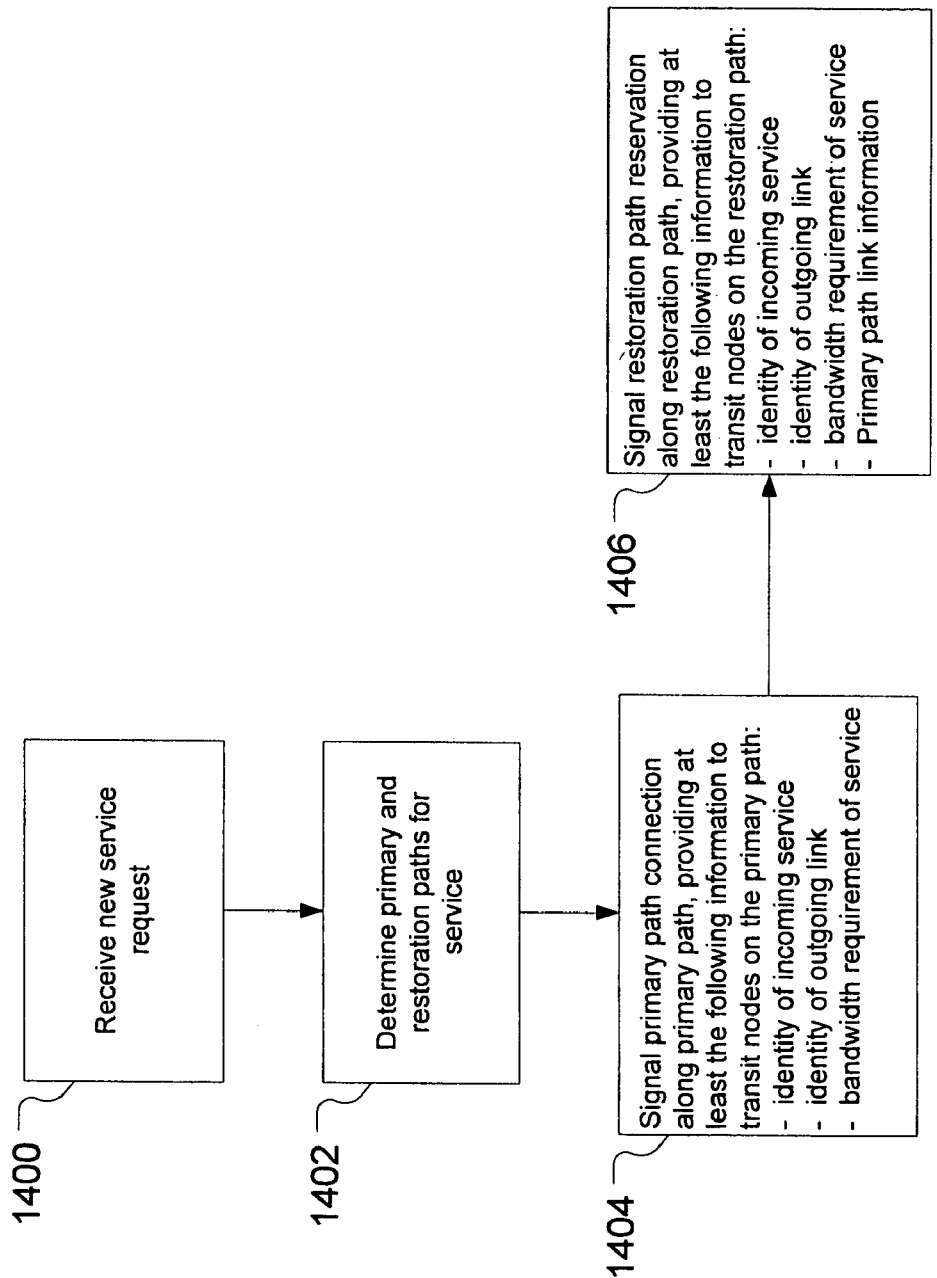
FIG. 14 illustrates an exemplary connection setup procedure extension to support sharing in mesh networks.

The extension to the service setup procedure that supports sharing in mesh networks is illustrated by the exemplary procedure of FIG. 14. As shown, in step 1400, a new service request is received. This may be at the source node for the service or more generally at a distributed or centralized service or network manager. Next, in step 1402, a determination of a suitable primary/restoration path pair is made for the service. Then, in step 1404, signaling is performed along the primary path for the service, wherein the identity of the incoming service, the identity of the outgoing link, and the bandwidth requirement of the service are provided to transit nodes on the primary path. Finally, in step 1406, signaling is performed along the restoration path to achieve reservation of bandwidth for the service, wherein the identity of the incoming service, the identity of the outgoing link, the bandwidth requirement of the service, and the primary path link information (e.g., $V_{pnl}$) are provided to transit nodes on the restoration path.

Signaling along the primary and restoration paths can be implemented using suitable signaling protocols including one or more of a Craft interface, simple network management protocol (SNMP), transmission control protocol/Internet protocol (TCP/IP) direct connections, PNNI, RSVP-TE, and constrained route-label directed path (CR-LDP) protocol.

OSPF Exemplary Implementation

The principles described in this specification can be applied to a broad class of different networks by working within defined protocols for those networks and/or providing extensions to existing protocols for those networks. For example, sharing may be realized within Internet protocol (IP) networks by appropriate extensions to the protocols used within IP networks for distribution of link-state information and setup/reservation of paths.

As a specific example, a popular dynamic routing protocol used in autonomous systems built from IP networks is open shortest path first (OSPF). OSPF includes mechanisms for determination and distribution of link-state information. The distribution includes both time-based and trigger-based flooding mechanisms that support both full and incremental distribution of link-state information between nodes in the network. More information on OSPF can be found in Moy, J., "OSPF version 2," RFC1247, July 1991, incorporated herein by reference in its entirety.

Recent extensions to OSPF include the opaque link state advertisement (LSA) option. This option effectively provides for the use of the OSPF flooding mechanism to distribute optional application-specific information in the OSPF IP messages that are flooded through a network. By defining an application-specific type for sharing information, the opaque LSA option allows sharing information, preferably in a compact and efficient format (e.g., node-link vector or node vector) to be distributed throughout the network and reach the various nodes that control the reservation and allocation of bandwidth on protection links within the network. The OSPF LSA option is described in Coltun, R., RFC2370—OSPF Opaque LSA Option, Network Working Group, July 1998, incorporated herein by reference in its entirety.

The sharing information that has been distributed to the nodes in the network can be used to calculate, reserve, and allocate bandwidth on links. Popular protocols used in IP networks for establishment of paths (also known as "tunnels" in the language of the RFCs that describe those protocols) are RSVP and RSVP-TE. RSVP and RSVP-TE are described in detail in R. Braden, Ed., et al., "Resource Reservation Protocol (RSVP)—version 1 functional specification," RFC2205, September 1997, and "D. Awduche, et al., "RSVP-TE: Extensions to RSVP for LSP tunnels", RFC3029, December 2001, respectively, each incorporated herein by reference in its entirety.

Shared Restoration Extensions to OSPF

The following describes how the concepts of shared restoration may be applied to IP networks by appropriate extension of the OSPF/OSPF-TE protocols. These extensions allow OSPF/OSPF-TE to disseminate sharing information to nodes in an IP network and enable nodes to identify, for each new service, an optimal combination of a primary path and a restoration path, from source to destination, such that the amount of bandwidth reserved on the restoration path is minimized.

The extensions described herein assume an IP network with traffic engineering (TE) support such as that described by the multiprotocol label switched (MPLS) umbrella of protocols. More background information on MPLS-based recovery can be found in Sharma, V., Hellstrand, F., et al., "Framework for MPLS-based Recovery," IETF draft-ietf-mpls-recovery-frmwrk-07.txt, September 2002 incorporated herein by reference in its entirety. More background on shared mesh protection under MPLS can be found in Qureshi, M., et al., "MPLS-TE Shared Mesh Protection," IETF draft-qureshi-mpls-shared-protection-00.txt, October 2002.

The extensions described herein address the issues of supporting shared mesh protection in mesh networks that is guaranteed for one failure at a time. It is assumed that the restoration path is disjoint from the primary path and is pre-computed and reserved at the time of the primary path setup. Bandwidth is reserved but not allocated prior to an actual failure. Once the failure of a primary path is identified, the protection path is then activated by allocating the reserved bandwidth, thereby supporting fast restoration. By reserving the bandwidth in anticipation of a failure but not allocating the bandwidth until the failure actually occurs, it is possible to share the reserved restoration bandwidth on a particular link among multiple other connections that do not have common elements (links, nodes) in their primary paths (other than the common source and destination nodes).

The pre-computation of the protection path can be done in one of several ways, depending on the available information. One way is to calculate a disjoint path using the same link weights as those used in the calculation of the primary path. In this case, one can use RSVP-TE extensions for shared mesh protection to compute locally, at every node along the protection path, the amount of shared protection bandwidth required on each of the links that constitute the restoration path. More information on this approach can be found in Liuh, H. A., et al., "RSVP-TE Extension for Shared Mesh Protection," IETF draft-liu-rsvp-mpls-shared-protection-00.txt, October 2002 ("Liuh '02"), incorporated herein by reference in its entirety. While some sharing of protection bandwidth may be realized in this approach, the amount of bandwidth reserved for recovery is typically not minimized since the sharing potential on each of the links is not known before the protection path choice is made at the source node.

In contrast, the proposed extensions to OSPF-TE provide for sufficient information to be disseminated to each node to support efficient restoration path calculation and a significant improvement in network utilization.

Given a primary path between a source-destination pair, there are a couple of different methods to compute the optimal restoration path. One way is to compute 'N' disjoint paths (with respect to the given primary) and then start a resource signaling procedure (through protocols like RSVP) to determine the path that would result in the least amount of bandwidth being reserved on each hop (link) of the protection path. Extensions to RSVP-TE have been proposed to allow for this computation; however, those extensions involve sending signaling messages across each of the nodes that constitute a potential restoration path, with likely crank-backs. In contrast, the proposed extensions to OSPF-TE make it possible to compute a primary and restoration path combination that utilizes the network resources efficiently with reduced signaling and a reduced crank-back load. These extensions to OSPF-TE are meant to work alongside the RSVP-TE extensions [Liuh '02] While the latter provides the minimal topological information needed for guaranteed restoration, the former allows for efficient use of network resources.

The information made available to network nodes by these extensions can be used to build an extended link-state database just as node link-state advertisements are used to build a "regular" link-state database. The difference is that the extended link-state database (referred to below as the TE/Share database) has additional link attributes. Uses of the TE/Share database include (1) monitoring the extended link attributes and (2) globally optimized computation of protection paths.

In this scheme, in order to support sharing/restoration, every node maintains a local sharing information database (e.g., the TE/Share database). This database contains a data structure for each link L that the node owns. The data structure for each link contains information (e.g., bandwidth, link-id) about all the other links in the network for which link L provides restoration capacity. Since this could be a large amount of information for a large network, only changes in this database are advertised. Note that, in practice, links are unidirectional. By convention, the node that owns a link is the one that is connected to the outgoing interface side of the link, and that node is the one that makes advertisements about the link.

As an example, let link L be an outgoing link from node R, where link L is part of a restoration path for a primary path of bandwidth B1, which passes through links L1, L2, and L3. Assuming that link L is not a part of any other restoration path, then the advertisements for link L from node R would be B1::L1,L2,L3. This advertisement says the bandwidth reserved on link L with respect to a failure of link L1, L2, or L3 is B1. If link L is subsequently used to provide restoration for another primary path of bandwidth B2, which passes through links L2, L4, L5, then the advertisements for link L from node R would then be B1+B2::L2; B2::L4,L5. Note that the new advertisement contains no information for links L1 and L3, since the protection bandwidth reserved on link L with respect to those links did not change. Note that B1+B2 bandwidth is now required to protect against the failure of link L2, since two primary paths share link L2, one of bandwidth Bi and one of bandwidth B2.

Each time a link is used as a restoration link, and the required shared-mesh-protection bandwidth is reserved, the TE/Share database is updated to reflect the changes if any that are necessary. Note that, although it is preferable for the TE/Share database to be different from the LSA database, it is possible to use a common database. However, since it is desirable to keep the LSA advertisements as small as possible, only the changes to the TE/Share database are advertised. Such a restriction might require a separation of the databases on most OSPF implementations.

Although the extensions proposed herein do not specify how to compute primary or restoration paths, they do provide information useful in making an optimal restoration path choice (with respect to a given primary path) from a network utilization standpoint.

In one implementation, the primary path is provided as a list of node-ids (i.e., the path is specified by the nodes through which it passes) by a route-database. However, to find out if indeed a primary path can be supported through the specified node-ids, and to determine the exact links through which it traverses, a signaling protocol such as the proposed extension to RSVP-TE [liuh '02] could be used.

Sharing

When a new service is added to a network, the source node or a network management entity has the task of determining appropriate primary and restoration paths for that service. Assuming a set of candidate primary paths can be calculated for the service as well as a set of potential restoration paths for one or more of those primary paths, it is then of interest to determine, for each candidate primary path, a restoration path that offers the best sharing opportunity. One metric that can be used to evaluate a restoration path is the overall amount of additional bandwidth that must be reserved in the network to support protection of the new service using that restoration path. By choosing a restoration path that would require the minimum amount of additional bandwidth to be reserved along its links, an operator can reduce the overall impact to the available capacity in the network.

Assume that a candidate primary path P of bandwidth $B_p$ is chosen for a new service. Assume further that a number of candidate restoration paths $R_1, R_2, R_3, \ldots, R_N$ are also chosen that are disjoint from primary path P. Let P-set be the set of all links that constitute primary path P. Let Rj-set denote the set of links Li (i={1, \ldots, m} where m is the number of links in Rj) that make up restoration path Rj. Next, let B-Li-set denote the set of links in the network for which link Li already provides restoration capacity (where for B was chosen here as a mnemonic for "backup"). With these assumptions, the following observations can be made:

(a) No sharing possible: If any B-Li-Set is null, then the corresponding link Li is not already providing restoration capacity for any link in the network. Since it is not already backing up any links, it does not currently have any reserved restoration bandwidth to share; and, if it were to be used as part of a restoration path for primary path P, then it would be necessary to reserve the full amount of the primary path's bandwidth $B_p$ on link Li. In this case, the "cost" assigned to this link of the restoration path under consideration would be Bp. On the other hand, if B-Li-set is not null, then some sharing potential exists on link Li, but it still needs to be seen whether this sharing potential applies to any of the links of the primary path under consideration.

(b) Sharing possible—scenario A: For non-null B-Li-sets, it is of interest to see if any of the links that are protected by Li are in the primary path. If the intersection, denoted I-Li-set, between P-Set and the B-Li-Set for a link Li is null, then link Li is not providing protection for any of the primary path links, but it is providing some level of protection for links in other primary paths in the network that are disjoint from the primary path of interest. Thus, by definition, some protection bandwidth sharing is possible on link Li. There are two cases.

In the first case, the bandwidth Br(i) that is presently reserved on link Li is greater than or equal to Bp. In this case, no additional bandwidth need be reserved to protect the new service, and the cost of using this link of the candidate restoration path is zero.

In the second case, Bp is greater than the presently reserved bandwidth Br(i) on link Li, and the incremental bandwidth that needs to be reserved is Bp-Br(i). If, however, Bp is greater than the total capacity of the link, then the link cannot be used to protect the service, and the cost of link Li is preferably set to a sufficiently high value to exclude this link and, in fact, this entire candidate restoration path, from further consideration as a restoration path for this service on this primary path. Alternatively, this "total capacity" constraint may be applied to exclude such paths from being included when the set of candidate restoration paths is originally generated.

(c) Sharing possible—scenario B: Finally, if the intersection I-Li-set between B-Li-set and P-set is non-null, then the intersection indicates which links of the candidate primary path are already protected by link Li for other primary paths. If a link Lk (from I-Li-set) is already protected by link Li, then the total amount of bandwidth that will need to be reserved on link Li to protect against a failure of link Lk is at least the amount of protection bandwidth Bk needed on link Li to protect other services on link Lk plus the bandwidth Bp of the new service. There are again two cases.

In the first case, the bandwidth Br(i) that is presently reserved on link Li is greater than or equal to Bp+Bk for all links Lk in I-Li-set. In this case, no additional bandwidth need be reserved to protect the new service, and the cost of using this link of the candidate restoration path is zero.

In the second case, Bp+Bk is greater than the presently reserved bandwidth on link Li for at least one link Lk in I-Li-set, and the incremental bandwidth that needs to be reserved is Bp+max(Bk)|$_k$-Br. If, however, Bp+max(Bk)|$_k$ is greater than the total capacity of the link, then, the link cannot be used to protect the service and the cost of link Li should be set to a sufficiently high value to exclude this link and, in fact, this entire candidate restoration path, from further consideration as a restoration path for this service on the considered primary path.

Figure 15:
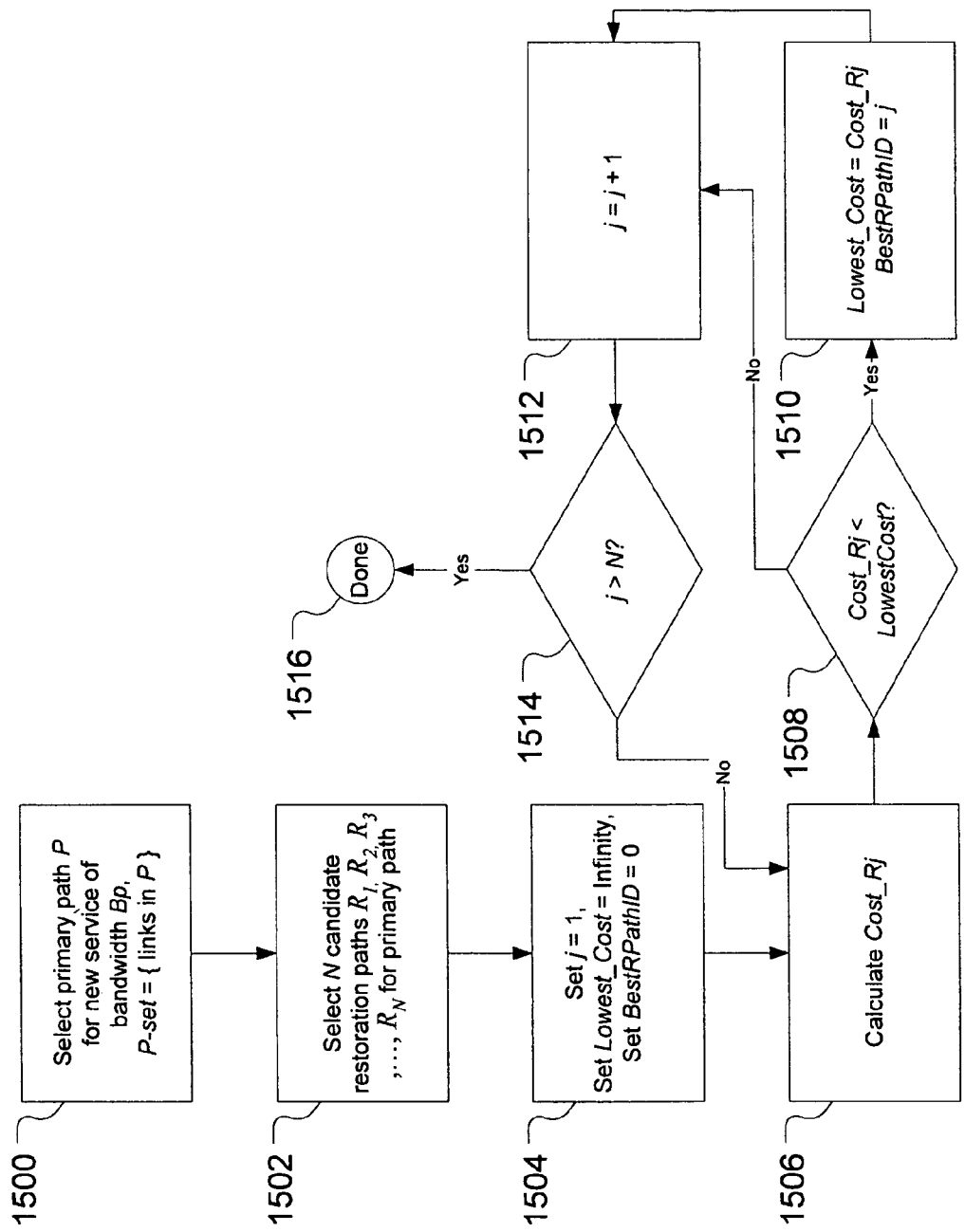
FIG. 15 illustrates an exemplary procedure for determining a minimum-cost restoration path given a particular primary path.

The above information is consolidated into an exemplary procedure for determining a minimum-cost restoration path given a particular primary path as illustrated by FIG. 15. As shown, in step 1500, a primary path is selected for a new service of bandwidth Bp, and the set of links P-set on that primary path is initialized. Next, in step 1502, N candidate restoration paths are chosen from amongst the possible alternative paths in the network that are disjoint from the primary path. In step 1504, restoration path index j is initialized to zero, and the variables Lowest_Cost and BestRPathID are initialized to a sufficiently high value (e.g., infinity) and 0, respectively. Next, in step 1506, the cost Cost_Rj of the restoration path is calculated as a sum of the costs of its constituent links (more detail is shown in FIG. 16 described below), and the calculated Cost_Rj is compared with the current value of Lowest_Cost in the test of step 1508.

If Cost_Rj is less than Lowest_Cost, then, in step 1510, Lowest_Cost is set equal to Cost_Rj, and BestRPathID is set equal to restoration path index j. Next, or if the test of step 1508 fails, in step 1512, index j is incremented, and the test of step 1514 is then performed to determine whether all the candidate restoration paths have been considered. If they have, then the procedure finishes in step 1516. If they have not, then the procedure continues with the calculation of the cost of the next candidate restoration path in step 1506.

Figure 16:
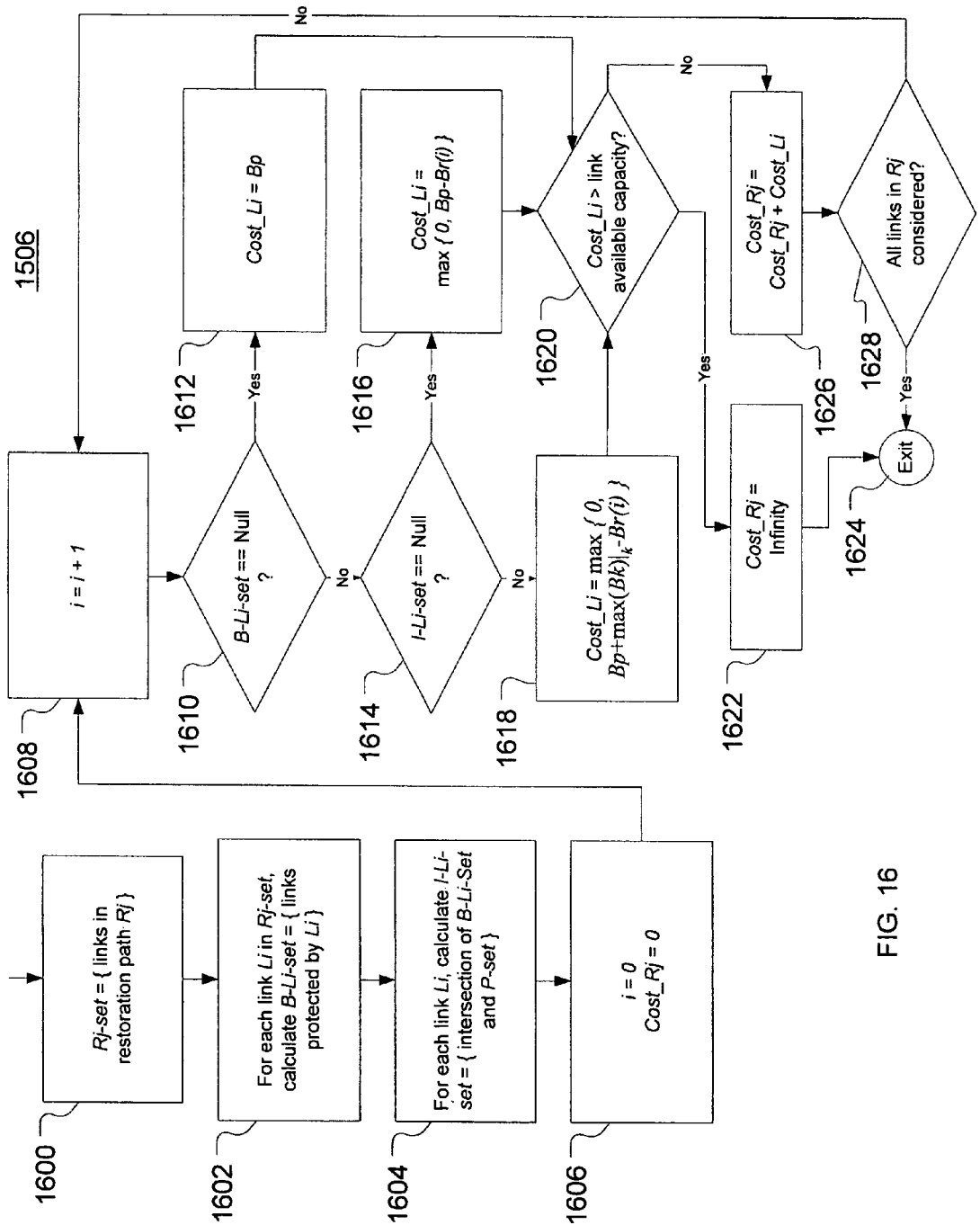
FIG. 16 illustrates an exemplary procedure for calculating the cost of each restoration path Rj per step 1506 of FIG. 15.

FIG. 16 illustrates an exemplary procedure for calculating the cost of each restoration path Rj per step 1506 of FIG. 15. The procedure begins in step 1600 with the initialization of Rj-set={links in candidate restoration path Rj}. Next, in step 1602, for each link Li in Rj-set, B-Li-set={links protected by Li}. Note that this protection information is stored locally, centrally, or in distributed fashion at one or more nodes in the network and may be communicated completely or incrementally and stored via one or more of the mechanisms discussed elsewhere in this specification (e.g., OSPF flooding mechanism and OSPF opaque LSA and TE/Share database). In step 1604, for each link Li, I-Li-set={intersection of B-Li-Set and P-set}. Next, in step 1606, link index i and variable Cost_Rj are initialized to zero, and, in step 1608, index i is incremented.

In step 1610, a test is done to see if B-Li-set is null indicating the lack of any sharing potential in link Li. If the set is null, then, in step 1612, Cost_Li is set equal to the bandwidth Bp of the primary path. Otherwise, in step 1614, as test is performed to determine whether the intersection set I-Li-set is null indicating no common links between the primary path and those links being protected by link Li.

If the intersection set is null, then, in step 1616, Cost_Li is set equal to the maximum of either zero or the result of subtracting the bandwidth Br(i) that is already reserved on link Li from the bandwidth Bp of the new primary path service. If the intersection is non-null, then, in step 1618, Cost_Li is set equal to the maximum of zero and Bp+$\max|_k(Bk)-Br(i)$.

Following steps 1612, 1616, or 1618, the test of step 1620 is performed to determine whether the additional bandwidth, if any, required on link Li exceeds the available capacity of link Li. If it does, then, in step 1622, Cost_Rj is set to a sufficiently high value (e.g., infinity), and the procedure exits in step 1624. Otherwise, in step 1626, the cost of the current link is added to the current cost of the restoration path, and the procedure continues to step 1628, which determines whether all of the links in the current protection path Rj have been considered. If not, then the processing returns to step 1608; otherwise, processing exits at step 1624.

Figure 17:
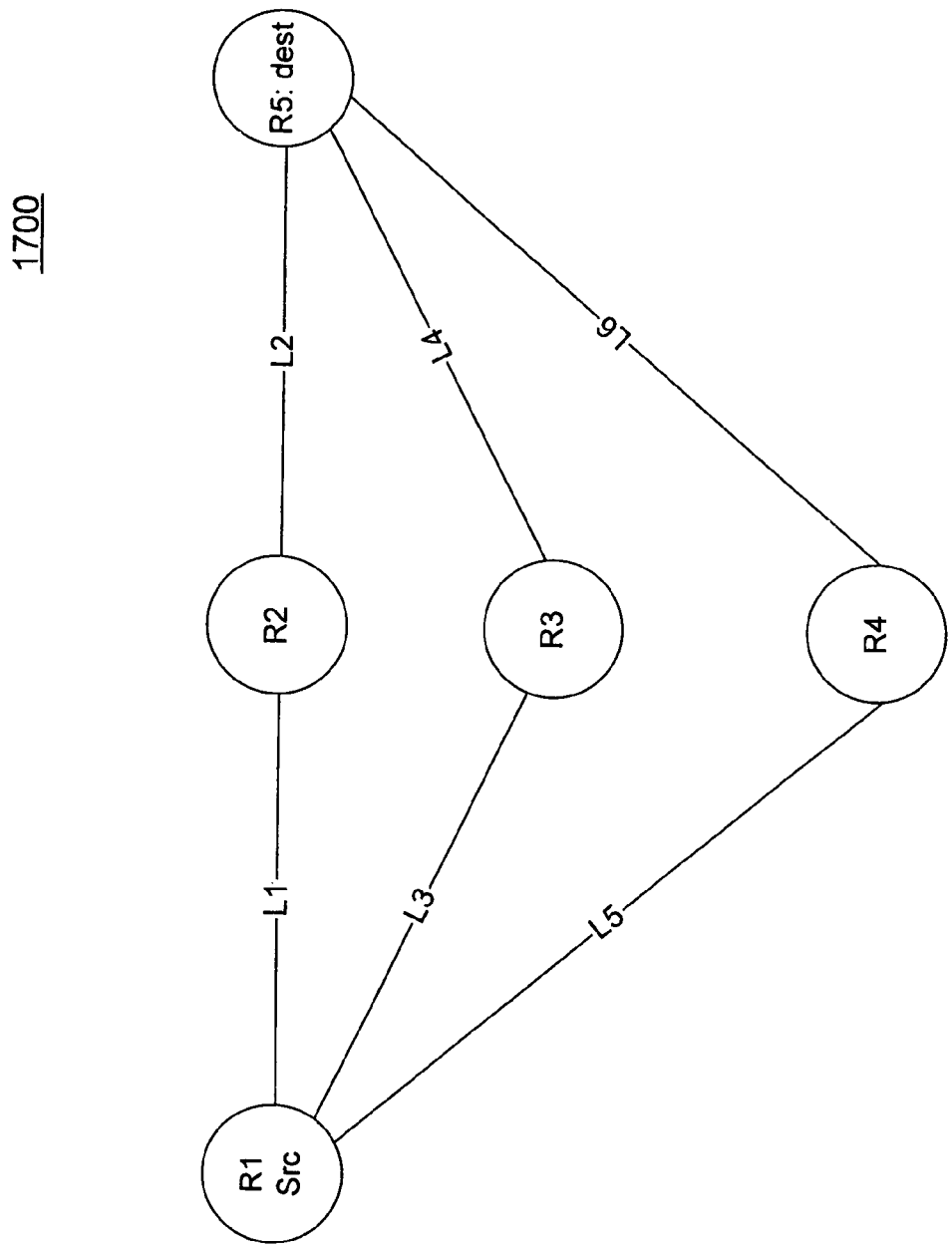
FIG. 17 illustrates a portion of a mesh network.

As an example, consider the partial network 1700 of FIG. 17. Consider the primary path L1-L2 with four units of bandwidth. Also, assume that there are two possible disjoint routes (with respect to the primary path) to the destination, namely route A (L3-L4) and route B (L5-L6). Further, assume that the entries of the current TE/Share database (DB) are as shown below:

Entry for L3 in TE/Share DB→4::L1, L8; 5::L10
Entry for L4 in TE/Share DB→4::L8, L9
Entry for L5 in TE/Share DB→4::L9, L10
Entry for L6 in TE/Share DB→4::L8, L10

The P-set for this example is {L1, L2}, the first R-set, $R_A$-set {L3, L4} and the second R-set, $R_B$-set={L5, L6}. The B-Li-sets for restoration path A are B-L3-set={L1, L8, L10} and B-L4-set={L8, L9}. Similarly, the B-Li-sets for restoration path B are B-L5-set={L9, L10}, B-L6-set={L8, L10}. Evaluating the first restoration path, it is noted that none of the B-Li-sets are null, thus each of the links within the first restoration path offers some potential for sharing. Here, for example, the entry for link L3 indicates that L3 needs to reserve four units of bandwidth to protect L1 and L8 and five units of bandwidth to protect L10. Note that links L8, L9, and L10 are outside of the partial network 1700 shown in FIG. 17, but are still considered in the above example to levy protection requirements on the links as indicated below. Note that the actual reserved bandwidth on link L3 would be the maximum of those two bandwidths, namely five units. Similarly, the entry for L4 indicates that L4 needs to reserve four units of bandwidth to protect against failures on L8 and L9. The entries for links L5 and L6 are interpreted similarly.

In operation, source node R1 would compare the primary path L1-L2 against the entries for every link in a restoration path (e.g., $R_A$-set={L3, L4}) and repeat the comparison for all possible restoration paths (e.g., $R_A$-set and $R_B$-set). Upon comparison with path L3-L4, it is found that link L1 is already shared and that, if node R1 were to choose this restoration path, then the reservation bandwidth on L3 would need to be increased by 3 (i.e., 4+4−5) additional units of bandwidth. However, no additional bandwidth would need to be reserved on L4.

Upon comparison with restoration path L5-L6, it is found that the intersection of P-set {L1, L2} and $R_B$-set {L8, L9, L10} is null, and no additional units of bandwidth would need to be reserved (since 4 units have been reserved already). Therefore, under such circumstances, the restoration path L5-L6 would be considered to be the better restoration path.

On the other hand, if the entries corresponding to L3 and L4 remain unaltered, but those corresponding to L5 and L6 have changed to those below:

Entry for L5 in TE/Share DB→1::L9, L10
Entry for L6 in TE/Share DB→1::L8, L10 then it can be seen that choosing restoration path L5, L6 would require a total of six additional units of bandwidth (i.e., three additional units for each of links L5 and L6) to support a primary path of four units of bandwidth. In this case, path L3-L4 is a better choice for restoration since only a total of three additional units of bandwidth need to be reserved in the network.

LSA Formats for Sharing

The Shared Restoration LSA starts with the standard LSA header. The LSA payload includes one or more nested Type/Length/Value (TLV) triplets for extensibility. The Length field defines the length of the value portion in octets (a TLV with no value portion would have a length of zero). The TLV is padded to a four-octet alignment. Padding is not included in the length field (so a three octet value would have a length of three, but the total size of the TLV would be eight octets). Nested TLVs are also 32-bit aligned. Unrecognized types are ignored. All types between 32,768 and 65,535 are reserved for vendor-specific extensions. All other undefined type codes are reserved for future assignment by the Internet Assigned Number Authority (IANA). A Shared Restoration LSA contains one top-level TLV. The Restoration TLV describes a single link of the advertising node. Only one Restoration TLV is be carried in each LSA. The Link TLV is type 1; the length is variable and describes the length of the value field. The Link Type (1 octet), Local Interface Index (4 octets), and Local Interface IP Address (4 octets) should be non-zero, while the value of the reserved field should be zero and is reserved for future use. All other fields defined are present conditional to the value of the Resource Flag field.

The Link Type field defines the type of the link: 1 implies point-to-point, 2 implies multi-access. The Local Interface IP Address field specifies the IP address of the interface corresponding to this link. This field is 4 octets in length. The format described supports IPV4 addressing, and the reserved fields can accommodate IPV6. The Reserved field can be used to specify this, and the length of the TLV can be appropriately increased. The first octet of the value field, the Resource Flag, describes the kind of resources that follow. If Resource Flag is set to 0x01, only the restoration bandwidth and the maximum restoration bandwidth are present, where restoration bandwidth is the currently allocated restoration bandwidth on that link and the maximum restoration bandwidth is the maximum amount of restoration bandwidth allowed on that link. Both the Restoration Bandwidth and the Maximum Restoration Bandwidth fields are expressed in IEEE floating-point format and specified in bytes.

If the Resource Flag is set to 0x10, then the Restoration Bandwidth and the Maximum Restoration Bandwidth fields are absent. What follows in the LSA are the various primary links that this link provides restoration for, and the bandwidth on each of them. The Bandwidth field describes the amount of bandwidth in IEEE format, in bytes. The Primary Links fields following the Bandwidth field are the primary links for which this link provides restoration, and whose bandwidth on each of them is specified by the Bandwidth field. Once again, only IPV4 addresses are illustrated. The Reserved field may be used in the future to indicate IPV6 addresses. The Number of Primary Links field describes the number of primary links that follow the Bandwidth field.

If the Resource Flag is set to 0x20, once again the Restoration Bandwidth and Maximum Restoration Bandwidth fields are absent. What follows in the LSA are the various primary links that this link provides restoration for. This case is similar to the case when Resource Flag is set to 0x10, except that this case addresses the issue of finding bandwidth sharing, rather than the actual amount of bandwidth that is shared. In a way, this is a binary form of the previous case, wherein the problem of "can sharing be done" is addressed in a true-or-false form. Once again, all IP addresses are IPV4, and the Reserved field may be used in the future to indicate IPV6 addresses.

Cases where the Resource Flag is set to 0x11 and 0x21 are similar to cases 0x10 and 0x20, respectively. However, the Restoration Bandwidth and the Maximum Restoration Bandwidth fields are also present. Note that, with Resource Flag set to 0x11, the source node would have detailed information about the constraint and degree of sharing of link restoration bandwidths during the computation of restoration path. Use of other modes trades away the network utilization with less information for advertisement and local bookkeeping.

A summary of one possible structure of link-state advertisement per opaque LSA extensions is as follows:
Fields: Intf|N-id|Flag|AW|LC|AC|D|U-SN|Len|Rid|Rid| . . . |Rid| where the fields in the LSA are as follows:
  Intf—the interface number (in its node) of this link (16 bits)
  N-id—the neighbor's IP address (32 bits)
  Flag—determines what follows in the rest of the LSA
  AW—the administrative weight of the link (16 bits)
  LC—the bandwidth capacity of the link (16 bits)
  AC—the bandwidth that is actually available for use (24 bits)
  U-SN—the update sequence number (32 bits)
  Len—number of Rid that follows in this LSA (8 bits)
  Rid—id of a node, for which the binary node vector value is 1 (32 bits)

Advertising only non-zero elements of the node-binary vector can reduce significantly the amount of the advertised data.

Use and Handling of the Shared Restoration LSAs

Nodes originate Shared Restoration LSAs whenever the TE/Share database changes and whenever otherwise indicated by OSPF (an LSA refresh, for example). Upon receipt of a changed Shared Restoration LSA, a node will update its TE/Share database. No shortest path first (SPF) or other route calculations are necessary. Interoperability with nodes that do not implement the extensions should not have problems interoperating with those that do, as the Opaque LSAs will be silently ignored. The result, however, will be that the network might not be able to utilize the resource as efficiently and may fail to find a restoration path when there is a viable one.

Reservation of the Protection Capacity Pool

The protection capacity reserved on a given link is also known as a capacity pool because it may be shared among multiple paths for protection purposes. In the embodiment of SMDN 100 of FIG. 1, this pool may be either statically provisioned or dynamically assigned. In both cases, an MPLS switch located at each node in the SMDN is capable of setting aside capacity on each of its connected links without actually allocating it to any LSPs. In practice, each protection LSP is set up with zero or some minimum bandwidth to support operation, administration, and maintenance (OAM) packets associated with the protection signaling of the network. This bandwidth is typically smaller than the bandwidth reserved to protect the primary LSP traffic.

In case of static provisioning, a pool of bandwidth on each link is set aside in advance of service provisioning specifically for the purpose of recovering traffic affected by a failure. If the amount of protection bandwidth is known in advance, then static allocation becomes an option. For example, in the case where the SMDN to be protected has a ring topology, half of the available network bandwidth might be statically allocated in advance as the protection bandwidth. Independent of what combination of services of different bandwidths get added to the working half of the bandwidth, the protection half of the bandwidth should be sufficient to protect all working traffic affected by a single link or node failure in the network. By using static allocation, in applying shared mesh protection methodology, bookkeeping is minimized. The call admission control (i.e., the process that accepts a new call or data communication request into the network) for the working traffic (LSP) typically will only admit those calls that will be sufficiently protected by the available bandwidth along the protection path (given at most a single failure in the network). In the case of dynamic assignment, the size of the protection pool (i.e., the protection bandwidth reserved on each link of the network) may dynamically expand or shrink based on the protection needs of the network as new connections (LSPs) are being admitted or established, and existing connections (LSPs) are being removed, respectively. Thus, dynamic assignment provides flexibility to adapt the protection to changes in the traffic.

In a distributed implementation of the shared mesh data network, when sharing information is distributed across the nodes in the network, each node along a new protection path computes the amount of additional protection bandwidth it might need on its downstream connected link along the new protection path to protect a corresponding new primary LSP. For additional protection bandwidth, a node first checks for the availability of the additional bandwidth on the connected link, and, if the additional bandwidth is available, then the node adds the additional bandwidth to the reserve protection pool of the connected link that is downstream of the node along the protection path.

In case of the centralized server approach, a centralized server computes the additional protection bandwidth needed on each link along the protection path to admit a new connection (LSP). This information is then conveyed as part of network signaling to establish the protection LSP.

Fast Failure Detection and Notification

As in other asynchronous transport networks, an SMDN that incorporates MPLS for traffic engineering might suffer from uncertainty and potentially unbounded delay in the delivery of packets. This sometimes makes it more difficult to achieve fast failure detection and notification. This is because a failure might not be detected by monitoring just the absence of packet arrivals at a destination. Specifically, there may be ambiguity in distinguishing between the absence of packets due to a failure of an LSP and the absence of traffic on the LSP due to a lull in communication between the source and destination. Therefore, to achieve fast failure detection, in certain implementations of an SMDN that utilizes MPLS for traffic engineering, any of four alternative approaches might be used.

In the first approach, failure detection relies on the physical transport (optical layer) to detect and propagate failure indications up into the MPLS layer. In this approach, every node in the network is assumed to be capable of propagating failure indications downstream by inserting forward-defect-indicator operations-and-maintenance (FDI-OAM) packets into the flow of traffic. More details on OAM and FDI-OAM in MPLS networks can be found in ITU-T Recommendation Y.1711, "OAM mechanism for MPLS networks," November 2002 (herein Y.1711), incorporated herein by reference in its entirety. In this approach, as soon as a node that is downstream from a physical-layer failure detects the failure, it inserts FDI-OAM packets carrying the failure indication in all affected LSPs passing through it. Note that these FDI-OAM packets are inserted in-band in the downstream direction. The destination node of each of the affected primary paths will ultimately receive these special OAM packets. Upon receiving this in-band failure notification, the destination passes the failure information to the source of the affected LSP using backward-defect-indicator OAM (BDI-OAM) packets (also defined in Y.1711). Note that a failure indication from the destination to the source is passed using a pre-established LSP that is disjoint from the failed primary LSP.

Using this first approach, the SMDN can recover quickly (e.g., on the order of tens of milliseconds) from failures that are detectable at the optical layer. However, there may be other failures above the optical layer that can cause failure of LSPs. Since these failures might not be detectable at the optical layer, optical-layer detection alone might not provide full coverage for failure monitoring of MPLS paths (LSPs).

In a second approach, failure detection and protection at the LSP level can be achieved by periodically inserting special OAM packets, known as fast failure detection (FFD) packets, into the primary LSPs of the SMDN. When a working LSP is provisioned, the source node of the LSP is configured to generate and insert FFD-OAM packets periodically into the LSP with a time interval T. At the receiver side, the arrival of FFD-OAM packets is continuously monitored. The receiver registers a failure on the LSP when it does not see any FFD-OAM packets on the LSP for an interval of nT, where n is a configurable integer value ($n \geq 1$). Note that a larger value of n reduces false failure detection probability.

False failure detection occurs when packet delays or loss of FFD-OAM packets (rather than a true connection failure) result in incorrect declaration of an LSP failure. This problem can be addressed within the packet quality-of-service (QoS) framework. For example, one can mark the label of these packets in such a way that these packets are treated with high priority in scheduling and buffer management at each label-switched node within each node of the LSP. Consequently, delay jitters and dropping of FFD-OAM packets are minimized. QoS prioritization can also be applied to FDI-OAM and BDI-OAM packets to improve performance of the first approach, which was based on failure indication at the optical-transport layer.

In a third approach, the source node of an LSP inserts FFD-OAM packets when the LSP is idle. Specifically, when the LSP is idle for more than a specified time interval T an FFD-OAM packet is inserted and sent to the destination node. The destination node will declare a failure of the LSP when the LSP is in the idle state for an interval greater than nT where n and T are provisionable parameters of the network. The value of n should be selected such that false failure detection probability is minimized.

Finally, in a fourth approach, a combination of an optical-layer detection mechanism (e.g., the first approach) and a higher-level MPLS-layer detection mechanism (e.g., the second or third approach) is used to achieve fast and comprehensive failure coverage and recovery.

Assigning Reserve Capacity to Protection LSPs

It is assumed that every protection LSP is established with an assigned bandwidth of zero or some minimal value sufficient to carry OAM traffic. After a failure, traffic coming into the ingress node for a primary LSP is switched to its corresponding protection LSP, and traffic exiting the egress node for the primary LSP is selected from the protection LSP, instead of from the primary LSP. The aggregate bandwidth for the protected traffic on primary LSPs is reserved in advance as part of the protection pool in the SMDN. Note that the bandwidth of the protection pool is not reassigned to any protection LSP. After the failure, each protection LSP that is providing protection against a specific failure needs to be assigned the same bandwidth and QoS characteristics as were assigned to the primary LSP it protects. This requires changing the bandwidth assignment of each of these protection LSPs. This can be accomplished through RSVP-TE using its bandwidth change procedure (see RFC 3209 for details).

Switching Between Working and Protection LSPs

As discussed above, after detecting a failure, end nodes of an LSP switch traffic from a primary (i.e., working) LSP to its corresponding protection LSP. Note that both working and protection LSPs typically enter the ingress node and exit the egress node using different ports.

At the ingress node, this may be accomplished by the node maintaining two different next-hop label-forwarding entry (NHLFE) entries in the MPLS forwarding equivalence class-to-NHLFE (FEC-to-NHLFE or FTN) map (one for the working path and the other for protection path) and activating only one of these at a time. Since the FTN is used to map incoming client packets to an NHLFE, activating one or the other of these entries will serve to direct packets coming into an ingress node to the working or the protection path, effectively switching between working and protection LSPs. Thus, protection switching on ingress involves switching from the working to the protection NHLFE.

On the egress node, there is a separate NHLFE entry for working and protection LSPs dictating the next action. Based on the label (for a switch-wide label-space implementation) or combination of port and label (for a port-based label-space implementation) that the packet carries, the proper entry is chosen and correspondingly the next action/operation (e.g., pop the label and pass the payload to the client layer) (see RFC 3031) is dictated by the entry for the packet. Thus, no specific switching really needs to be performed at the egress node since the action has the effect of delivering the data from the proper path (e.g., primary or protection) to the client. Note that both entries normally dictate the same next action.

Functional Architecture

An SMDN can be partitioned into a variety of modules. These modules are part of a network manager that may be implemented at a centralized server or distributed partially or fully to the nodes. Some exemplary modules, representing one specific functional partitioning of the components of an SMDN, which provide functionality such as fault detection and notification, protection switching, signaling and control, routing, and OAM, are listed below:

Service Agent (SA): This module provides interface to application or service management for provisioning paths with different restoration/QoS requirements.

Path Management (PM): This module primarily consists of the signaling protocol such as RSVP-TE. It is responsible for path setup, refresh, tear-down, and monitoring functions.

Path Computation (PC): This module provides path computation services to the path management module. It interfaces with the link-state-based routing protocol to obtain the network topology.

Network Topology (NT): This module primarily consists of the link-state-based routing protocol. It is responsible for monitoring and updating of network topology.

Fault Detection (FD): This module provides the fault detection capability. Faults can be detected through monitoring of layer-1, layer-2, and layer-3.

Fault Notification (FN): This module is responsible for notifying protection switching nodes of detected faults.

Protection Switching (PS): This module is responsible for switching the affected traffic onto a protection LSP after detecting a failure or receiving failure notification.

OAM&P (OAM): This module is responsible for providing performance monitoring functions on a per-LSP basis through use of special OAM&P packets. It can help in detecting any faults affecting the MPLS shim-layer.

Bandwidth-Sharing Information (BSI): This module is responsible for managing the sharing of information related to protection sharing in the SMDN. It provides functionality at each node to keep track of the sharing status at each of the incident links to that node. This module works in conjunction with the PM module, which uses special signaling to carry working path information (bandwidth, nodes, and links) along the protection path in the SMDN. This information is required to keep bandwidth-sharing information current.

These functional modules can be classified into two groups. The first group includes those functional modules that support a manually provisioned shared mesh protection service. This set includes the FD, FN, PS, and OAM modules. The second group includes modules that bring automation to resource discovery, path computation, and path establishment and management. These modules can perform signaling and control plane functions. They include the SA, PM, PC, and NT modules.

Figure 18:
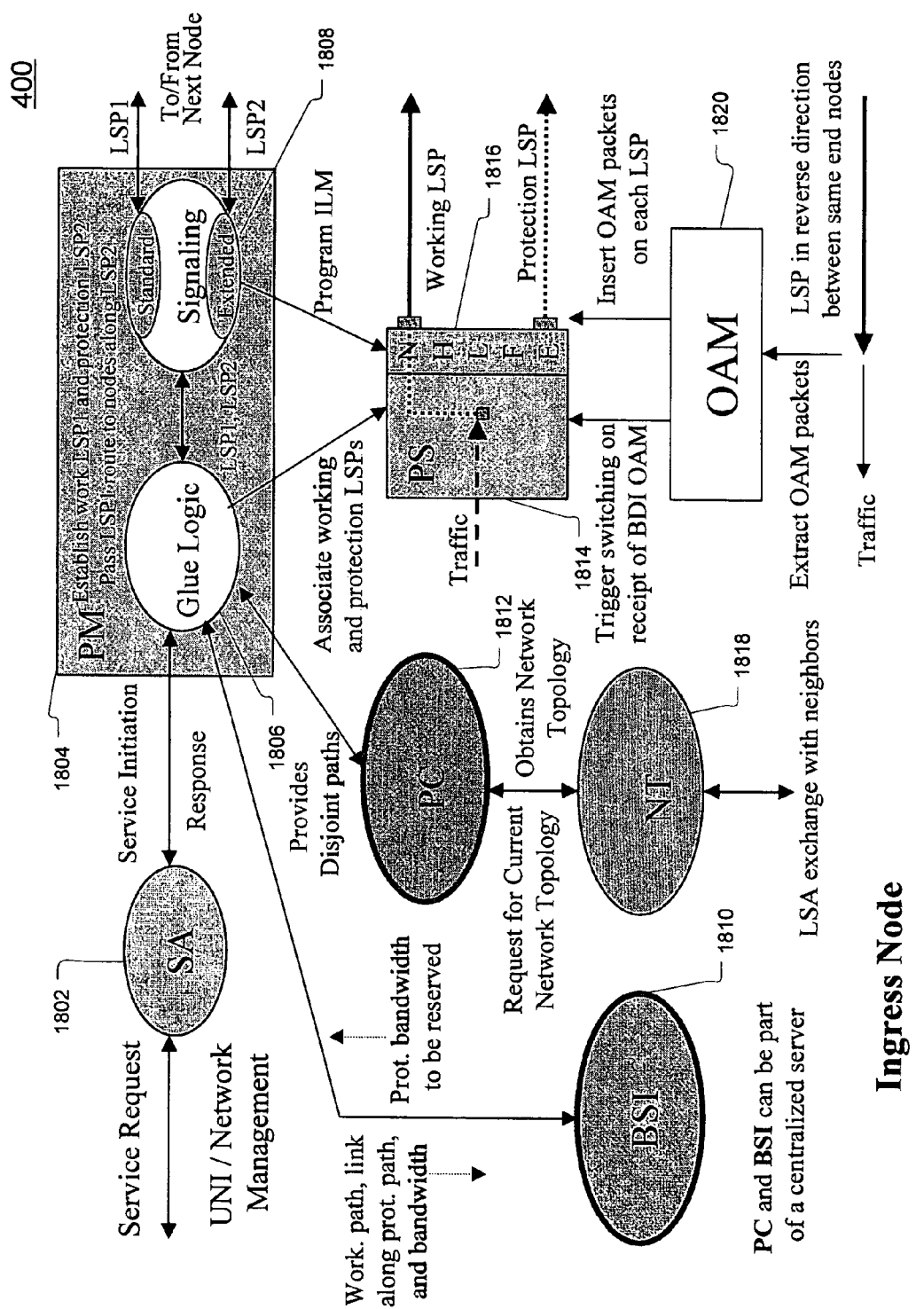
FIG. 18 illustrates exemplary modules, representing one specific functional partitioning of components of an ingress node of the SMDN of FIG. 1.
Figure 19:
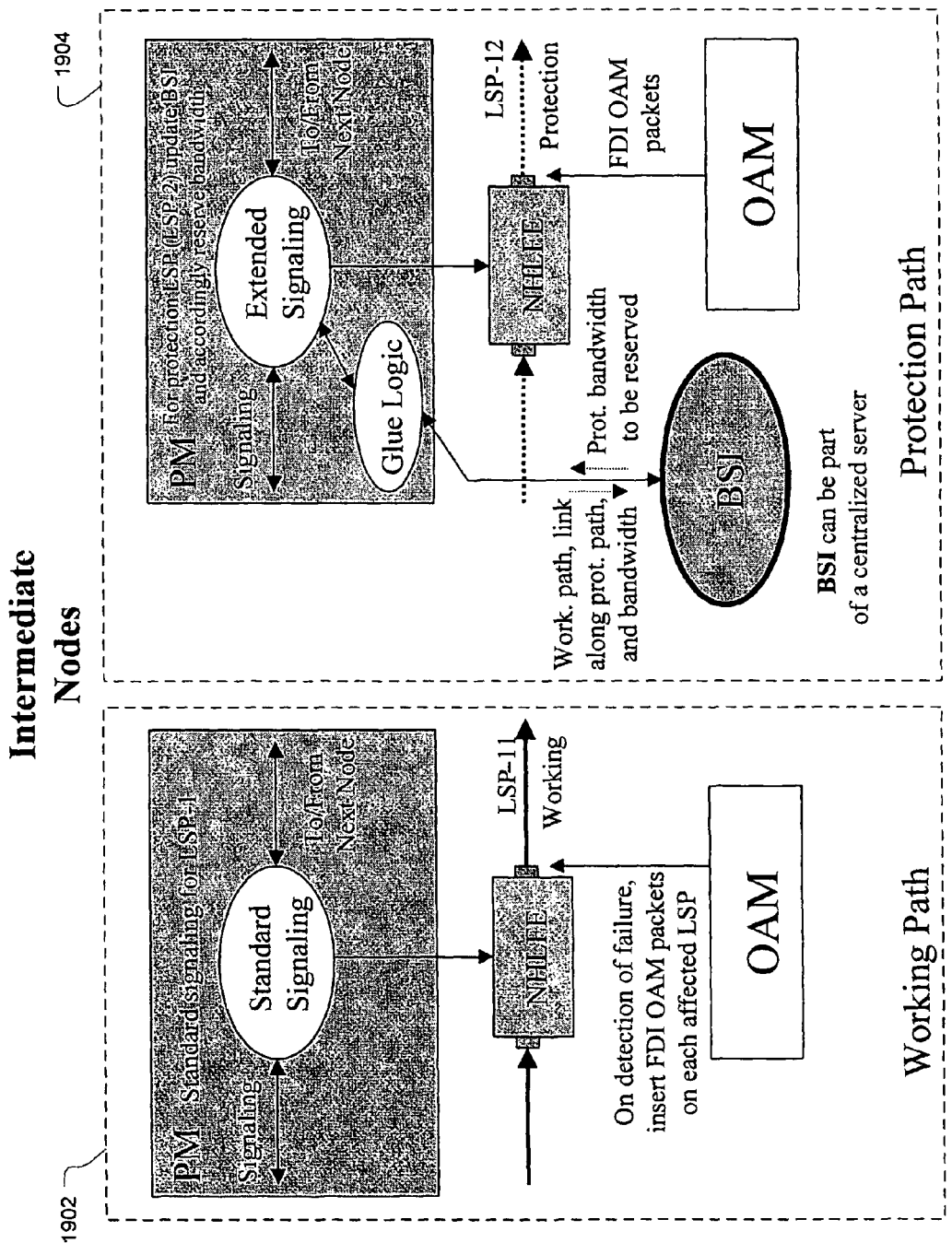
FIG. 19 illustrates exemplary modules included in intermediate nodes along a working path and a protection path of the SMDN of FIG. 1.
Figure 20:
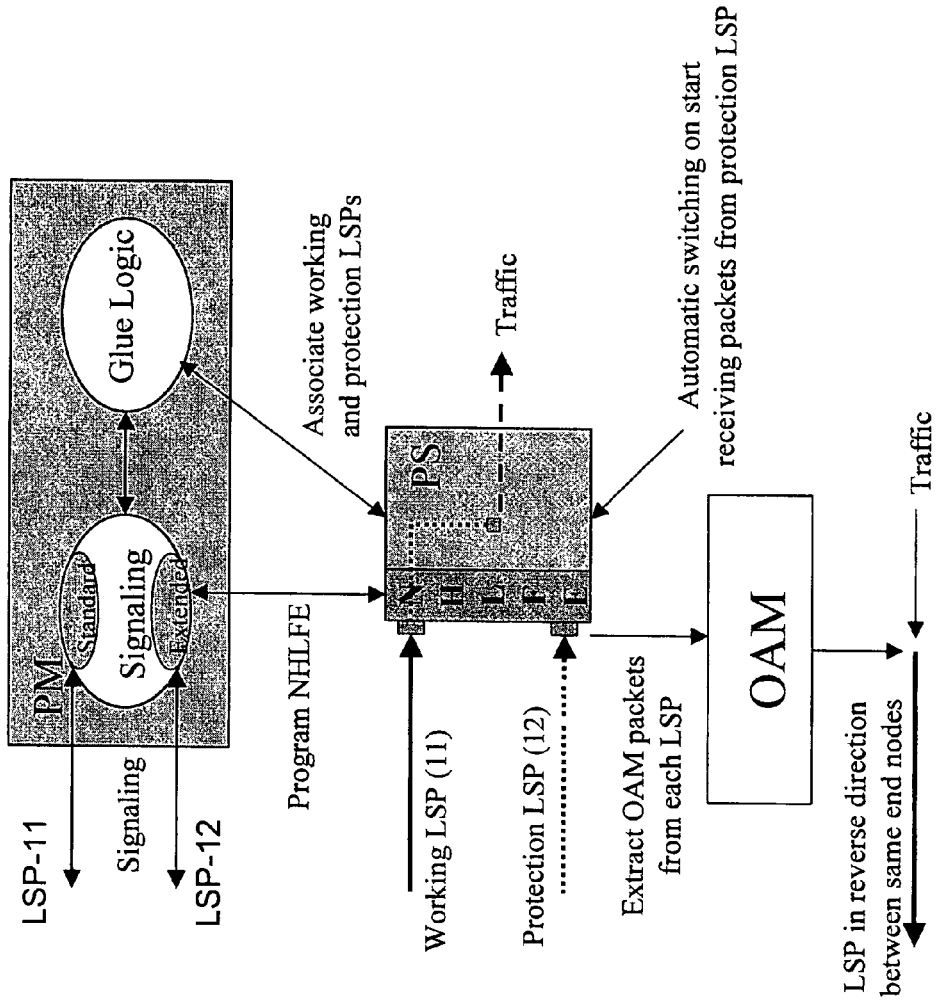
FIG. 20 illustrates exemplary modules, representing one specific functional partitioning of components of an egress node of the SMDN of FIG. 1.

FIGS. 18, 19, and 20 illustrate the functionality of the ingress, intermediate, and egress nodes, respectively, of the SMDN. These figures collectively illustrate a distributed implementation of the path computation function of SMDN 100 of FIG. 1. In contrast to the illustrated implementation, in a centralized implementation, path computation and sharing information functions would reside on a centralized server.

Ingress, Intermediate, and Egress Nodes

FIGS. 18, 19, and 20 depict the interrelationship of the subset of modules that comprise ingress, intermediate, and egress node operations of the nodes within an SMDN according to one embodiment of the present invention. Note that, typically, any node within an SMDN may at one time or another, for one service or another, serve as an ingress node, an intermediate node, or an egress node, or simultaneously as two or more of ingress, intermediate, or egress nodes. Therefore, FIGS. 18, 19, and 20 do not necessarily depict unique nodes in the SMDN, but rather highlight the relevant functions of a node that are associated with its operation as ingress, intermediate, or egress with respect to a particular LSP.

The function of each of the modules was described in the previous section. To complement those descriptions, the role of each of the modules in each of these nodes is described herein with respect to the exemplary establishment of a new service. For clarity, this example will parallel the example provided earlier of the addition of LSP-11 (working) and LSP-12 (protection) to SMDN 100 of FIG. 1.

To begin, a service request is received at node N4 of FIG. 1 for the establishment of an LSP between N4 and N2 of SMDN 100. Assume that, at the arrival of the request, the network was in a state captured by FIG. 1 and TABLE 1 of FIG. 2. Referring to FIG. 18, the service request is received and serviced by service agent (SA) 1802 of ingress node 1800 via either user network interface (UNI) or simple network management protocol (SNMP) signaling. Details on SNMP and ATM UNI can be found in RFC2570 and The ATM Forum, "ATM User Network Interface (UNI) version 4.1," November 2002 (herein "UNI4.1"), each incorporated herein by reference in its entirety. The SA provides a translation between the application-layer request for the service and path management (PM) function 1804, which is responsible for the establishment and monitoring of the health of the LSP and its protection path. As illustrated, the PM includes glue logic 1806 and standard and extended signaling components 1808. Glue logic 1806 allows the PM to interface with various other modules within the node that it needs to communicate with to accomplish its task, while signaling sub-module 1808 allows the PM to communicate information about the new paths to other nodes in the SMDN.

Specifically, glue logic 1806 allows the PM to communicate with path computation (PC) module 1812 to determine two suitable disjoint (if possible) paths for working and protection LSPs. The PC in turn interfaces to network topology (NT) module 1818 to gather current topology information (e.g., via link-state architecture (LSA) messages) used in the path computation. In this example, it can be assumed that PC 1812 returned the disjoint paths (N4-L3-N5-L4-N2) and (N4-L1-N1-L2-N2) to PM (possibly among other disjoint pairs) to consider as working and protection paths for the newly requested service.

Glue logic 1806 also allows the PM to communicate with bandwidth-sharing information (BSI) module 1810. The BSI module is responsible for managing the sharing of information related to protection in the SMDN associated with LSP-11 and LSP-12. Its function in N4 is to keep track of the sharing status at each of the incident links to N4 (namely L1 and L3). Thus, it does the bookkeeping for sharing for N4 and thus maintains the information corresponding to rows L1 and L3 of TABLE 1 (and, after update, TABLE 2 of FIG. 3). The BSI is also responsible for providing the PM with working-path information that it needs to share (along the protection path of the new LSP) to keep the network up-to-date with the sharing information.

The PM also interfaces via glue logic 1806 to protection switching (PS) module 1814 to indicate by which path (working or protection) incoming traffic will exit N4. As discussed before, this may be implemented by activating one or another of the two NHLFE entries in the (FTN) map (represented here by PS sub-module NHLFE 1816). During the creation of a service, the traffic is mapped to the NHLFE entry corresponding to the working LSP. The entry selection decision (and consequently the choice of working or protection path) may be overridden by information (e.g., via BDI-OAM packets) received via OAM module 1820 indicating a failure somewhere along the downstream working path, in which case the traffic mapping is switched to the other NHLFE entry corresponding to the protection LSP. Note that this switching of traffic between working and protection can also be forced via a network management command. OAM 1820 also functions to insert OAM packets (e.g., FFD-OAM and FDI-OAM) into the working and protection paths to support monitoring and failure detections in the SMDN.

Referring next to FIG. 19, labels 1902 and 1904 refer to functional modules that are active in an intermediate node along the working path and the protection path, respectively, of the SMDN. With respect to the present example, module 1902 depicts the operation of a node (e.g., N5) that is along working path LSP-11, and module 1904 depicts the operation of a node (e.g., N1) that is along protection path LSP-12.

As illustrated by module 1902, the PM in a working path intermediate node relays standard signaling along the path and directs incoming label-switched traffic to the next hop along the working path as indicated by the active entry (NHLFE) in the local incoming label map (ILM). If necessary (e.g., if a failure is detected), the local OAM function may insert FDI-OAM packets into relevant LSPs to support monitoring and failure detection in the SMDN.

As illustrated by module 1904, the PM in a protection path intermediate node performs similarly to the PM in the working path intermediate node but has some additional active modules as well. Namely, extended-signaling functions within the PM allow for the receipt of sharing information about the working path to be communicated via the glue logic to the local BSI module. As in the ingress node, the BSI will maintain and update sharing information associated with the node's incident links. For example, if module 1904 represents the active modules in intermediate node N1 along LSP-12, then it will store the sharing information corresponding to its incident links L1 and L2, namely rows L1 and L2 of TABLE 1 (and, after the establishment of the new LSP, rows L1 and L2 of TABLE 2).

Finally, in an egress node (illustrated by exemplary node 2000 of FIG. 20), the PM serves as a terminal point in the LSP signaling chain for both standard and extended signaling. It also interfaces to the PS to configure the two NHLFE entries corresponding to working and protection LSPs. The incoming label selects the NHLFE entry that, as discussed before, dictates the next action on the packet. In this case, NHLFE traffic is extracted (corresponding to which path is actively carrying traffic) and passed on to the node-attached client packet. In the case of penultimate hop popping, there might not be an NHLFE at the egress node. In this case, the previous node pops the label and the next operation is implicitly derived from the packet itself (for example, Internet protocol (IP) will be used to route the IP packet). An OAM module in the egress node extracts OAM packets from each LSP and inserts them in the corresponding LSPs in the reverse direction to support monitoring and failure detection and recovery in the SMDN.

While the embodiments of this invention have been discussed with respect to protection, they may equally well be applied to restoration, with the assumption that some or all of the calculations associated with paths are calculated after the detection of a failure.

While this invention has been described with respect to protection associated with situations where the protection was directed to single-point failures, the concepts, and, in particular, the link-state description, may be extended to multiple-point failure situations.

While various calculations within this invention have been described with respect to unit bandwidth services, these calculations could equally well be applied to non-unit bandwidth services, (e.g., by equating non-unit bandwidth services to an equivalent number of unit-bandwidth services) as would be understood to one skilled in the art.

While this invention has been described with respect to dissemination of sharing information by specific mechanisms including OSPF, alternative means for dissemination of information within mesh networks could also be used (e.g., RSVP-TE, TCP/IP connections, constrained routing label distribution protocol (CR-LDP)), and SNMP) as would be understood to one skilled in the art.

While aspects of this invention has been described in one or more embodiments in the context of mesh data networks running one or more of the multiprotocol-label switched (MPLS) traffic engineering extension protocols, those aspects are equally applicable to a wide class of networks where traffic engineering is supported, these networks classified as providing virtual-circuit services, as would be understood to one skilled in the art.

Note that, in one or more embodiments of the present invention, a node is assumed to have the intelligence for computations associated with aspects of the invention (e.g., for determining sharing, and calculating and reserving restoration bandwidth on links), however, as would be understood to one skilled in the art, a regional manager that supports one or more nodes can be substituted for the node's intelligence while remaining within the spirit and intent of the present invention. In this document, it should be understood that, in some cases, the regional manager may manage only a single node and be hosted by that node.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:
1. A method comprising:
 representing, in a network data structure, information associated with a mesh network having a plurality of nodes interconnected by a plurality of links, wherein the network data structure comprises, for each link in the network and each node and each other link in the network, a representation of a minimum amount of protection bandwidth required to be reserved on said each link to restore service upon failure of said each node or other link;
 receiving a request for a new service in the network, wherein the new service is represented by a service data structure comprising an identification of each link and transit node in a primary path for the new service;

determining, using the network and service data structures, whether the new service requires additional protection bandwidth to be reserved on any link in the network; and
updating the network data structure if any additional protection bandwidth is determined to be required for the new service.

2. The invention of claim 1, wherein the service data structure further comprises an identification of bandwidth associated with the new service.

3. The invention of claim 1, wherein the network is a virtual-circuit mesh data network that transmits packetized data.

4. The invention of claim 1, wherein the network data structure is distributed over the network such that at least one node in the network does not have all of the information in the network data structure.

5. The invention of claim 1, wherein each of the nodes in the network has all of the information in the network data structure.

6. The invention of claim 1, further comprising, in response to the new service request, determining a restoration path for the new service in the network using the network data structure.

7. The invention of claim 1, wherein:
the network data structure is an array of vectors, wherein:
each vector in the array corresponds to a different link in the network;
each vector in the array has a plurality of entries corresponding to the nodes and links in the network;
for a first vector corresponding to a first link, each entry in the first vector corresponding to a node or other link identifies the minimum amount of protection bandwidth required to be reserved on the first link to restore service upon failure of the node or other link; and
the service data structure is a primary path vector having a plurality of entries corresponding to the nodes and links in the network, wherein:
each entry of the primary path vector identifies whether the corresponding node or link is part of the primary path for the new service.

8. The invention of claim 7, wherein determining whether the new service requires any additional protection bandwidth to be reserved on a link A in the network comprises applying a vector addition operation between the primary path vector corresponding to the new service request and the vector of the array corresponding to the link A to form a result vector, and comparing the maximum value in the result vector with the bandwidth already reserved on the link A to determine whether any additional protection bandwidth is required for the new service.

9. The invention of claim 8, wherein the additional protection bandwidth is required and is reserved if any result vector entry is greater than the bandwidth already reserved on the link.

10. The invention of claim 8, wherein the vector addition operation is applied between the primary path vector and each vector in the array corresponding to each different link in a restoration path for the new service.

11. The invention of claim 1, wherein the service data structure is primary path node-link vector $V_{pnl}$.

12. The invention of claim 1, wherein a compact version of the network data structure is used for transmitting sharing information in order to reduce the amount of data that needs to be transmitted in the network to disseminate the information about each link.

13. The invention of claim 12, wherein transmission control protocol/Internet protocol (TCP/IP) connections are used for the dissemination.

14. The invention of claim 12, wherein the compact representation is a node aggregate vector $V_{na}$ wherein each element of $V_{na}$ corresponds to a node in the network wherein the element's value is a function of the maximum of reservation bandwidths reserved on all links incident to the node.

15. The invention of claim 12, wherein the dissemination is accomplished using a link-state routing protocol.

16. The invention of claim 1, wherein an incremental version of the network data structure is used to reduce the amount of data that is transmitted in the network to disseminate the information.

17. A network manager for a mesh network having a plurality of nodes interconnected by a plurality of links, the network manager adapted to:
represent, in a network data structure, information associated with the mesh network, wherein the network data structure comprises, for each link in the network versus each node and each other link in the network, a representation of a minimum amount of protection bandwidth required to be reserved on said each link to restore service upon failure of said each node or other link;
receive a request for a new service in the network, wherein the new service is represented by a service data structure comprising an identification of each link and transit node in a primary path for the new service;
determine, using the network and service data structures, whether the new service requires additional protection bandwidth to be reserved on any link in the network; and
update the network data structure if any additional protection bandwidth is determined to be required for the new service.

18. The invention of claim 17, wherein the network manager is distributed over the network.

19. The invention of claim 17, wherein the network manager is located at a single node of the network.

20. The invention of claim 17, wherein a compact version of the network data structure is used for transmitting sharing information in order to reduce the amount of data that needs to be transmitted in the network to disseminate the information about each link.

21. The invention of claim 1, wherein:
the network data structure is an array of vectors, wherein:
each vector in the array corresponds to a different link in the network;
each vector in the array has a plurality of entries corresponding to all the nodes and links in the network;
for a first vector corresponding to a first link, each entry in the first vector corresponding to a node or other link identifies the minimum amount of protection bandwidth required to be reserved on the first link to restore service upon failure of the node or other link; and
the service data structure is a primary path vector having a plurality of entries corresponding to the nodes and links in the network, wherein each entry of the primary path vector identifies whether the corresponding node or link is part of the primary path for the new service.

22. The invention of claim 1, wherein:
the network data structure is an array of vectors, wherein:
each vector in the array corresponds to a different link in the network;
each vector in the array has a plurality of entries corresponding to the nodes and links in the network;

for a first vector corresponding to a first link, each entry in the first vector corresponding to a node or other link identifies the minimum amount of protection bandwidth required to be reserved on the first link to restore service upon failure of the node or other link; and the service data structure is a primary path vector having a plurality of entries corresponding to all the nodes and links in the network, wherein each entry of the primary path vector identifies whether the corresponding node or link is or is not part of the primary path for the new service.

23. The invention of claim 1, wherein:

the network data structure is an array of vectors, wherein:

each vector in the array corresponds to a different link in the network;

each vector in the array has a plurality of entries corresponding to the nodes and links in the network;

for a first vector corresponding to a first link, each entry in the first vector corresponding to a node or other link identifies the minimum amount of protection bandwidth required to be reserved on the first link to restore service upon failure of the node or other link; and the service data structure is a primary path vector having a plurality of entries corresponding to the nodes and links in the network, wherein each entry of the primary path vector identifies whether the corresponding node or link is part of the primary path for the new service, wherein at least one entry of the primary path vector identifies that the corresponding node or link is not part of the primary path for the new service.

24. The invention of claim 21, wherein the service data structure is a primary path vector having a plurality of entries corresponding to all the nodes and links in the network, wherein each entry of the primary path vector identifies whether the corresponding node or link is or is not part of the primary path for the new service.

\* \* \* \* \*